(12) United States Patent
Rudolf et al.

(10) Patent No.: US 10,278,158 B2
(45) Date of Patent: Apr. 30, 2019

(54) DEVICE-TO-DEVICE (D2D) PRE-EMPTION AND ACCESS CONTROL

(71) Applicant: INTERDIGITAL PATENT HOLDINGS, INC., Wilmington, DE (US)

(72) Inventors: Marian Rudolf, Montreal (CA); Benoit Pelletier, Roxboro (CA); Diana Pani, Montreal (CA); Paul Marinier, Brossard (CA); Samian Kaur, Plymouth Meeting, PA (US); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/502,171

(22) PCT Filed: Aug. 6, 2015

(86) PCT No.: PCT/US2015/044088
§ 371 (c)(1),
(2) Date: Feb. 6, 2017

(87) PCT Pub. No.: WO2016/022849
PCT Pub. Date: Feb. 11, 2016

(65) Prior Publication Data
US 2017/0230939 A1 Aug. 10, 2017

Related U.S. Application Data

(60) Provisional application No. 62/034,115, filed on Aug. 6, 2014, provisional application No. 62/144,132, filed (Continued)

(51) Int. Cl.
*H04W 72/00* (2009.01)
*H04W 72/04* (2009.01)
(Continued)

(52) U.S. Cl.
CPC ......... *H04W 72/04* (2013.01); *H04L 12/1863* (2013.01); *H04L 29/08306* (2013.01);
(Continued)

(58) Field of Classification Search
CPC ..... H04W 72/04; H04W 92/18; H04W 4/005; H04W 88/02; H04W 72/1242; H04L 29/08306; H04L 12/1863
(Continued)

(56) References Cited

U.S. PATENT DOCUMENTS 8,099,097 B2   1/2012  Miyata
9,538,484 B2*  1/2017  Ryu ................... H04W 52/245
(Continued)

FOREIGN PATENT DOCUMENTS

JP   2007-288754   11/2007
JP   2008-042537   2/2008
(Continued)

OTHER PUBLICATIONS

3rd Generation Partnership Project (3GPP), TR 36.843 V12.0.1, "3rd Generation Partnership Project; Technical Specification Group Radio Access Network; Study on LTE Device to Device Proximity Services; Radio Aspects (Release 12)", Mar. 2014, 50 pages.
(Continued)

*Primary Examiner* — Amancio Gonzalez
(74) *Attorney, Agent, or Firm* — Quasim A. Shah

(57) ABSTRACT

Systems, methods, and instrumentalities are disclosed to determine access control and channel and signaling priority. A wireless transmit/receive unit (WTRU) may comprise a processor configured, at least in part, to determine device-to-device (D2D) data to be transmitted. The WTRU may determine if the D2D data may be transmitted. The WTRU may determine available scheduling assignment (SA) resources used for priority based D2D data signals. The
(Continued)

WTRU may select one or more available SA resources used for priority based D2D data signals. The WTRU may transmit the D2D data, wherein the D2D data may be transmitted on the selected SA resources.

23 Claims, 15 Drawing Sheets

Related U.S. Application Data on Apr. 7, 2015, provisional application No. 62/161,108, filed on May 13, 2015.

(51) Int. Cl.
| | | |
|---|---|---|
| *H04W 4/70* | (2018.01) | |
| *H04L 12/18* | (2006.01) | |
| *H04L 29/08* | (2006.01) | |
| *H04W 72/12* | (2009.01) | |
| *H04W 88/02* | (2009.01) | |
| *H04W 92/18* | (2009.01) | |

(52) U.S. Cl.
CPC ......... *H04W 4/70* (2018.02); *H04W 72/1242* (2013.01); *H04W 88/02* (2013.01); *H04W 92/18* (2013.01)

(58) Field of Classification Search
USPC .......................................................... 455/450
See application file for complete search history.

(56) References Cited

U.S. PATENT DOCUMENTS

| | | | |
|---|---|---|---|
| 2009/0129362 A1 | 5/2009 | Higuchi et al. | |
| 2011/0176498 A1 | 7/2011 | Montojo et al. | |
| 2013/0114531 A1 | 5/2013 | Ahn et al. | |
| 2013/0229995 A1 | 9/2013 | Cai et al. | |
| 2014/0029499 A1* | 1/2014 | Chu | H04W 52/0206 370/311 |
| 2014/0302867 A1 | 10/2014 | Mizusawa | |
| 2016/0345348 A1* | 11/2016 | Chae | H04W 8/005 |
| 2017/0041942 A1* | 2/2017 | Wallentin | H04W 72/1231 |

FOREIGN PATENT DOCUMENTS

| | | |
|---|---|---|
| JP | 2008-131069 | 6/2008 |
| WO | WO-2013/084694 | 6/2013 |
| WO | WO 2015/116865 A1 | 8/2015 |

OTHER PUBLICATIONS

3$^{rd}$ Generation Partnership Project (3GPP), R2-142047, "MAC functionalities for D2D communication", Intel Corporation, 3GPP TSG-RAN WG2, Meeting #86, Seoul, Korea, May 19-23, 2014, 4 pages.

3$^{rd}$ Generation Partnership Project (3GPP), R2-142561, "Report on [85bis#18] [LTE/D2D] User plane aspects of D2D Communication (QC)", Qualcomm Incorporated (Rapporteur), 3GPP TSG-RAN2, Meeting #86, Seoul, South Korea, May 19-23, 2014, 30 pages.

3$^{rd}$ Generation Partnership Project (3GPP), Tdoc R2-134238, "D2D Scheduling Procedure", Ericsson, 3GPP TSG-RAN WG2, Meeting #84, San Francisco, USA, Nov. 11-15, 2013, 7 pages.

3$^{rd}$ Generation Partnership Project (3GPP), "Status Report RAN WG2 to TSG-RAN # 63", 3GPP TSG RAN-63, Fukuoka, Japan, Mar. 3-6, 2014, 40 pages.

3$^{rd}$ Generation Partnership Project (3GPP), R1-142056, "Resource Allocation for Scheduling Assignment", Alcatel-Lucent Shanghai Bell, Alcatel-Lucent, 3GPP TSG RAN WG1 Meeting #77, Seoul, Korea, May 19-23, 2014, 4 pages.

"English Language Abstract", Japanese Patent Application No. 2008-042537, Feb. 21, 2008, 1 page.

* cited by examiner

DEVICE-TO-DEVICE (D2D) PRE-EMPTION AND ACCESS CONTROL

CROSS-REFERENCE TO RELATED APPLICATIONS

This application is the National Stage Entry under 35 U.S.C. § 371 of Patent Cooperation Treaty Application PCT/US2015/044088, filed Aug. 6, 2015, which claims the benefit of U.S. Provisional Patent Application No. 62/034,115, filed Aug. 6, 2014; U.S. Provisional Patent Application No. 62/144,132, filed Apr. 7, 2015; and U.S. Provisional Patent Application No. 62/161,108, filed May 13, 2015, the disclosures of all of which are hereby incorporated by reference as if fully set-forth herein in their respective entirety, for all purposes

BACKGROUND

Device-to-device (D2D) communications may be utilized for various purposes, such as public safety communications. D2D communications may be associated with standardized technologies, such as LTE, IEEE, etc. In LTE systems, access control and/or priority handling may be used to arbitrate access to and/or usage of wireless resources by terminals.

SUMMARY

Systems, methods, and instrumentalities are disclosed to determine access control and channel and signaling priority. A wireless transmit/receive unit (WTRU) may comprise a processor configured, at least in part, to determine device-to-device (D2D) data to be transmitted. The WTRU may determine if the D2D data may be transmitted. The WTRU may determine available scheduling assignment (SA) resources used for priority based D2D data signals. The WTRU may select one or more available SA resources used for priority based D2D data signals. The WTRU may transmit the D2D data, wherein the D2D data may be transmitted on the selected SA resources.

The WTRU may be configured to select the available SA resources from a preconfigured set of SA resources. The WTRU may be configured to receive configuration signaling and/or determine the available SA resources from the received configuration signaling.

Embodiments contemplate priority reception and/or transmission for D2D relays, for example. Embodiments contemplate signaling for usage of (e.g., guaranteed) segregated resources.

A wireless transmit/receive unit (WTRU) may comprise a receiver. The receiver may be configured to receive an allocation of one or more radio resources for one or more scheduling assignments (SA). The WTRU may comprise a processor. The processor may be configured to determine a first frequency domain SA (FD SA) pool. The first FD SA pool may include one or more SA allocated for at least one of a first priority device-to-device (D2D) transmission. The processor may be configured to determine a second FD SA pool. The second HD SA pool may include one or more SA allocated for at least one of a second priority D2D transmission. The WTRU may comprise a transmitter. The transmitter may be configured to send the at least one first priority D2D transmission using at least one radio resource for the one or more SA from the first FD SA pool. The transmitter may be configured to send the at least one second priority D2D transmission using at least one radio resource for the one or more SA from the second FD SA pool.

A wireless transmit/receive unit (WTRU) may be capable of device-to-device (D2D) communication. The WTRU may comprise a receiver. The receiver may be configured to receive at least one of: a first D2D channel or a first D2D signal. The WTRU may comprise a processor. The processor may be configured to determine if at least one of a second D2D channel or a second D2D signal is to be transmitted while the at least one of: the first D2D channel or the first D2D signal is being received. The processor may be configured to determine a relative priority between the at least one of: the first D2D channel or the first D2D signal, and the at least one of: the second D2D channel or the second D2D signal upon determining that the at least one of: a second D2D channel or a second D2D signal is to be transmitted while the at least one of: the first D2D channel or the first D2D signal is being received. The processor may be configured to determine a number of D2D subframes to be used for receiving which of the first D2D channel or the first D2D signal, or the second D2D channel or the second D2D signal has the higher relative priority.

A wireless transmit/receive unit (WTRU) may be capable of device-to-device (D2D) communication. The WTRU may comprise a processor. The processor may be configured to determine to transmit a pre-emption indication. The processor may be configured to determine to transmit the pre-emption indication via a scheduling assignment (SA). The WTRU may comprise a transmitter. The transmitter may be configured to send the SA as part of a control signal to another WTRU capable of D2D communication.

A wireless transmit/receive unit (WTRU) may comprise a receiver. The receiver may be configured to receive an allocation of one or more radio resources for one or more scheduling assignments (SA). The WTRU may comprise a processor. The processor may be configured to determine a first SA pool. The first SA pool may include one or more SA allocated for at least one of a first priority device-to-device (D2D) transmission. The processor may be configured to determine a second SA pool. The second SA pool may include one or more SA allocated for at least one of a second priority D2D transmission. The processor may be configured to compare a number of first priority scheduling occurrences associated with one or more resources for the one or more SA of the first SA pool to a threshold. The WTRU may comprise a transmitter. The transmitter may be configured to send the at least one first priority D2D transmission using at least one radio resource for the one or more SA from the first SA pool upon the number equaling or exceeding the threshold.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be examples and in no way limit the scope of the application. As used herein, the articles "a" and "an", absent further qualification or characterization, may be understood to mean "one or more" or "at least one", for example.

Figure 1A:
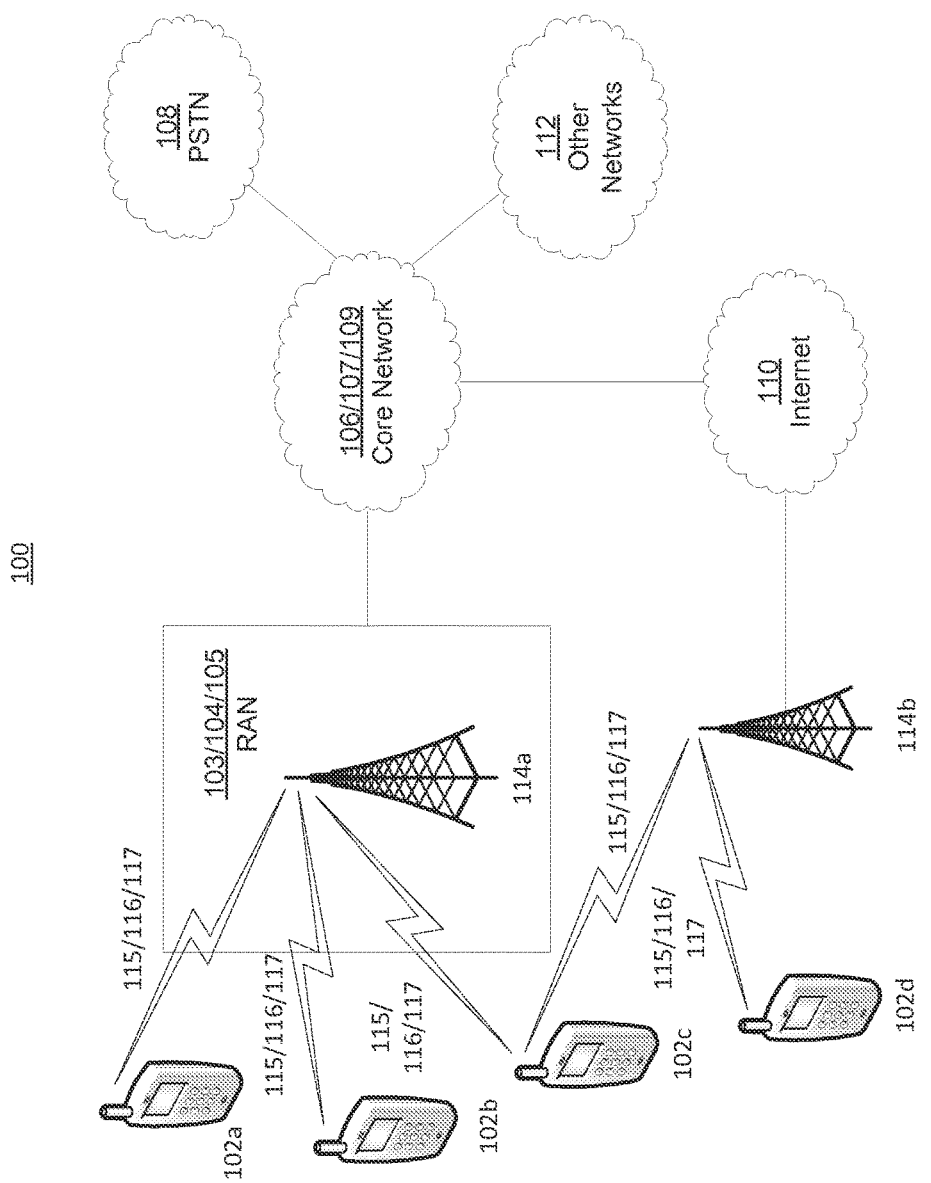
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (TDMA), orthogonal FDMA (OFDMA), tingle carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/ 117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, interim Standard 2000 (IS-2000), Interim Standard 95 (IS-95), interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing, services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being, connected to the RAN 103/104/105, which may be utilizing an E-UTRA radio technology, the core network 106/107/109 may also be in communication with another RAN (not shown) employing, a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b. 102c. 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
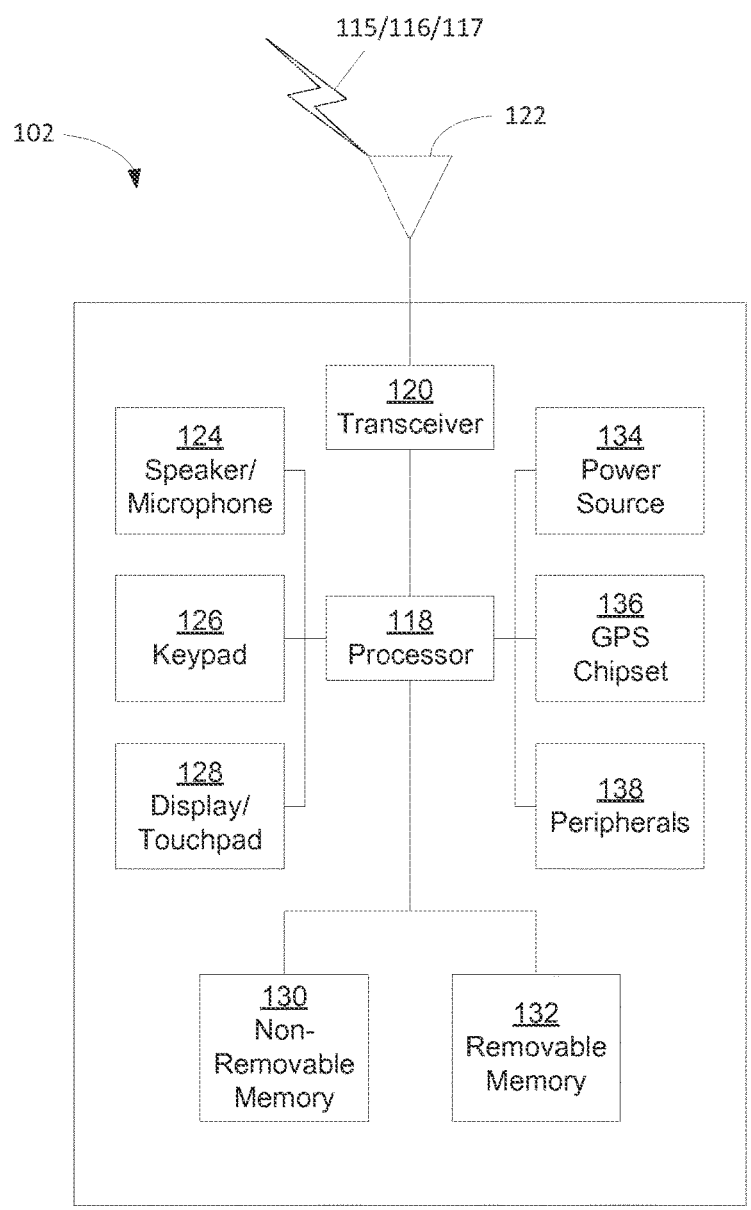
FIG. 1B is a system diagram of an example wireless transmit/receive unit (WTRU) that may be used within the communications system illustrated in FIG. 1A.

FIG. 1B is a system diagram of an example WTRU 102. As shown FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/ 117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.1, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc. solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
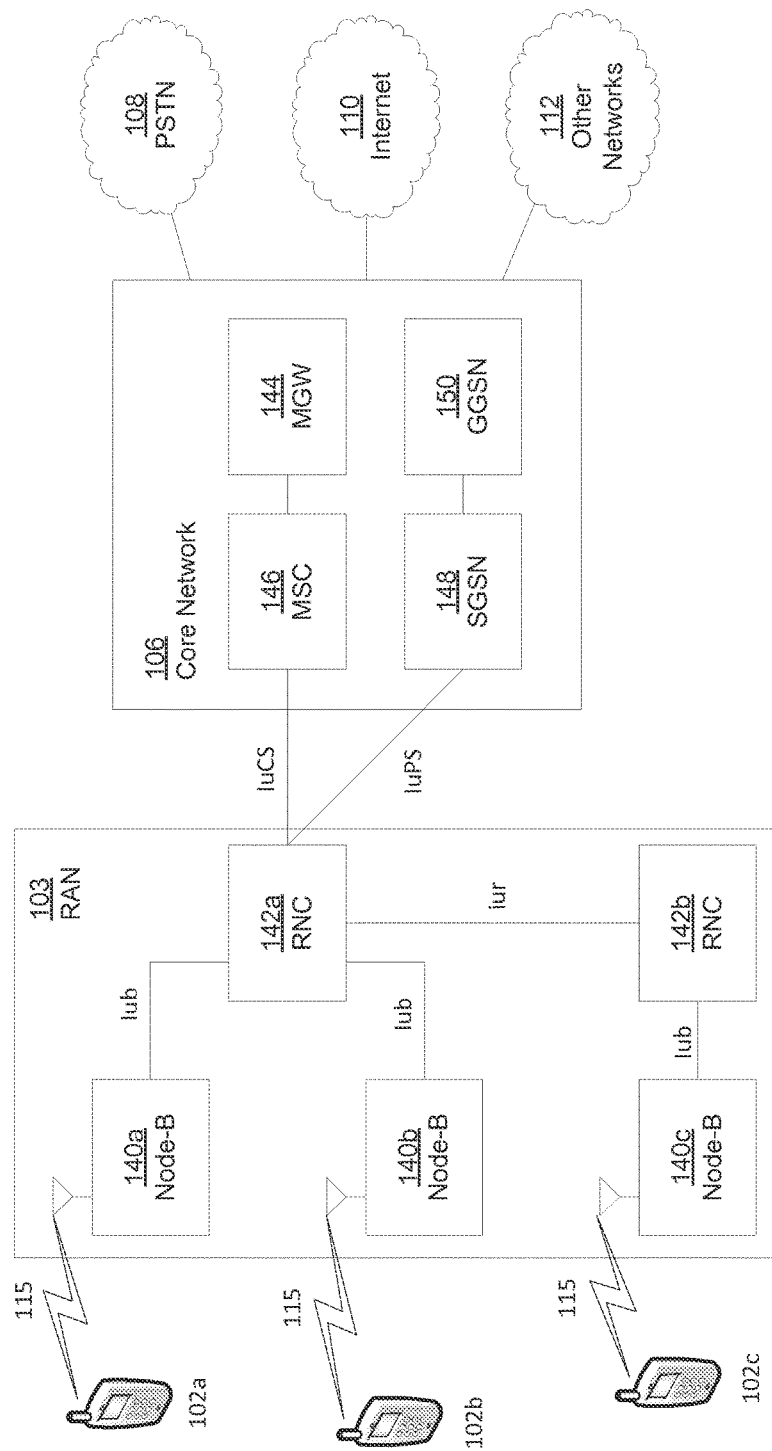
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a. 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
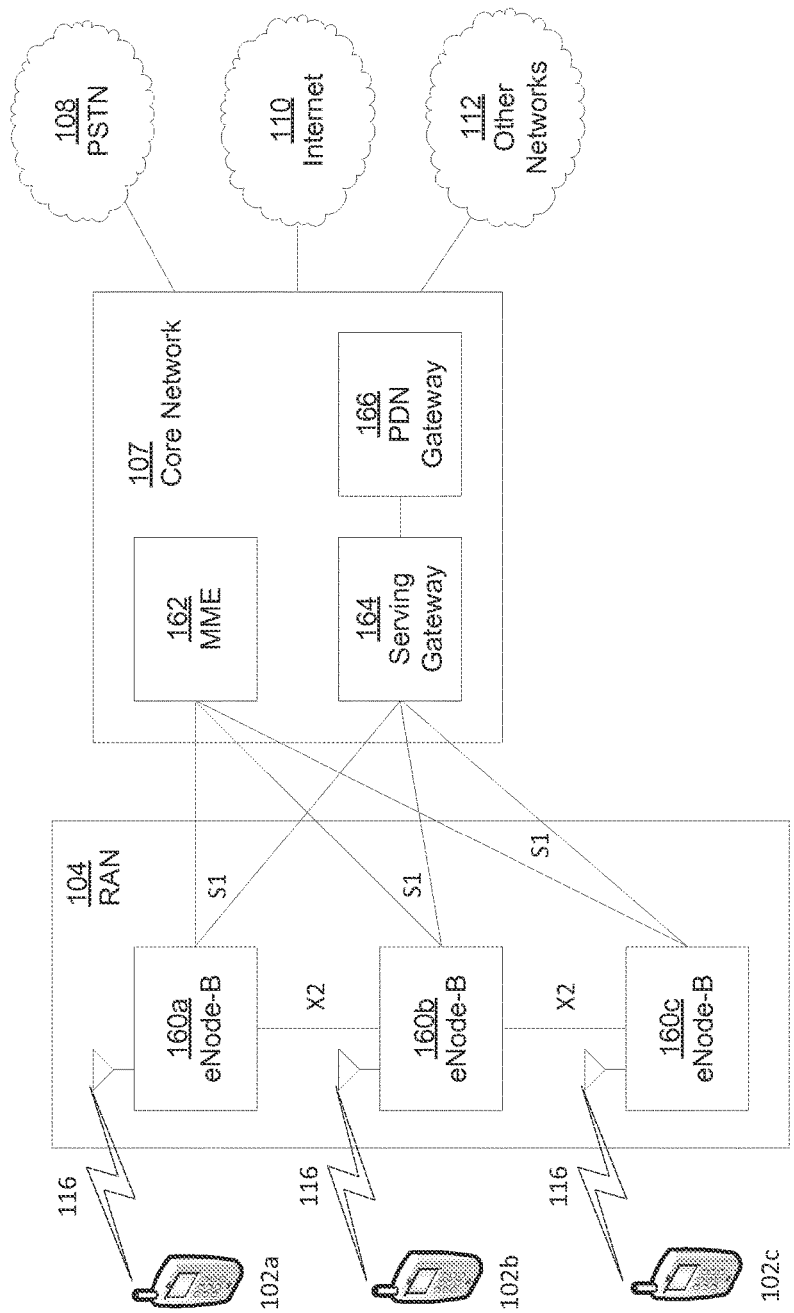
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and TP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108, in addition, the core network 107 may provide the WTRUs 102a, 102b, 102c with access to the networks 112, which may include other wired or wireless networks that are owned and/or operated by other service providers.

Figure 1E:
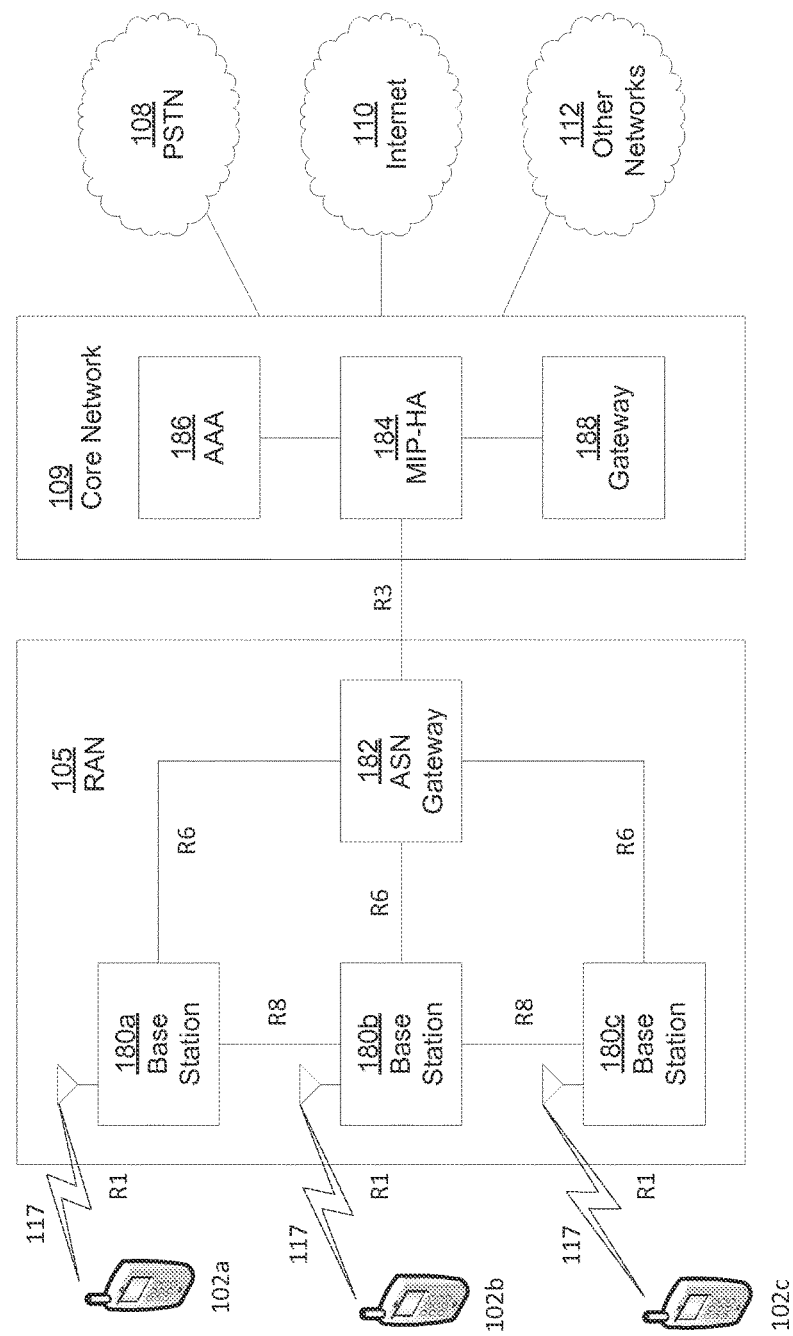
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c tray each be associated with a particular cell (not shown) the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a. 180b, 180c may be defined as an R1 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102*b*, 102*c* between the RAN 105 and the other ASNs. The communication link between the core network 109 and the other core networks may be defined as an R5 reference, which may include protocols for facilitating interworking between home core networks and visited core networks.

For 3GPP and/or LTE based radio access, support for D2D communications may allow for cost-efficient and high-capability public safety communications using LTE technology. This may be motivated by the desire to harmonize the radio access technology across jurisdictions in order to lower the CAPER and OPEX of radio-access technology available for the use of public safety (PS) type of applications. This may be motivated by LTE as a scalable wideband radio solution may allow for efficient multiplexing of different services types like voice and video.

Since PS applications may utilize (e.g., typically require) radio communications in areas that might not be under radio coverage of an LTE network, e.g. in tunnels, in deep basements, and/or following catastrophic system outages, there may be a usefulness to support D2D communications for PS in absence of any operating network and/or prior to the arrival of AdHoc deployed radio infrastructure. Even when operating in presence of operating network infrastructure, PS communications may utilize (e.g., typically require) higher reliability than commercial services.

PS type of applications, e.g. between first responders, may include direct push-to-talk speech services using multiple talk groups. PS type of applications may include services such as video push or download, for example, to make efficient use of the capabilities an LTE broadband radio provides.

D2D communications may be available for PS type of applications and/or commercial use cases, for example, perhaps when deployed. For example, a commercial use could be utility companies who often also require support for 2-way radio communications in areas not covered by network infrastructure. D2D services, such as discovery, are suitable signaling mechanisms to allow for proximity based services and/or traffic offload using LTE based radio access in commercial use cases.

Access control may be disclosed herein. Priority handling may be disclosed herein.

In LTE systems, there may be access control and/or priority handling mechanisms to arbitrate the access to and/or usage of wireless resources by terminals.

For example, system information broadcast (SIB) messages carried on broadcast channel (BCH) may carry information for which access service classes terminals attempting to connect to the cell are allowed, e.g. emergency only, maintenance only, and/or any type. Access control may be possible, for example, once a terminal device is connected to an LTE cell. For example, if there are more terminals connected to a cell than can be reliably supported, Access Stratum (AS) and/or Non-Access Stratum (NAS) connections from the network side may be terminated. Terminal devices may be re-directed to channels and/or bands of another radio access technology like GSM or 3G HSP, in the operator's network.

Access control in existing LTE networks may exist in one or more (e.g., many) forms. Access control in LTE networks may have in common that terminal devices may be denied and/or limited, for example, in terms of access to wireless resources by the network prior to a connection attempt and/or while being connected to cell(s).

LTE systems may offer techniques for priority handling of concurrently running wireless services. Priority handling may be used to ensure higher Quality of Service (QoS) data streams like conversational voice, video that may be served first, and/or with guaranteed bit rates or guaranteed latencies. Priority handling may be used to serve (e.g., first serve) control signaling (e.g., useful/essential control signaling).

For example, in LTE systems, priority handling of data with multiple users in the system may be possible by the base station (e.g., first) scheduling high-priority data with real-time QoS constraints in the Downlink (DL). Priority handling of data with multiple users in the system may be possible by the base station artificially reducing and/or throttling service data rates for lower priority download type of data. Systems, such as when supporting emergency calls, may implement priority handling for E911 calls to guarantee successful call setup percentages (e.g., much) higher and/or occurrences of dropped calls (e.g., much) lower than typically guaranteed for regular voice calls. If a single terminal device has multiple types of data to transmit concurrently, rules may specify to transmit higher priority data (e.g., first) when an UL transmission opportunity may have been granted. Lower priority data may complete (e.g., later), for example, once packets allocated higher logical channel priorities have completed their transmission.

Priority handling from the single user perspective and/or from the system perspective may be implemented in different forms in existing LTE systems. These may have in common that higher priority data may be transmitted (e.g., first) perhaps if useful, and/or lower priority data may be pre-empted from transmission if concurrent services have to be supported concurrently.

D2D communications may use LTE based radio access.

D2D communications using LTE based radio access may be designed to operate in network-control mode and/or in WTRU autonomous mode. Network-control mode may be referred to as Mode 1 and WTRU autonomous mode may be referred to as Mode 2. Mode 1 (Network controlled) may be possible (e.g., only possible) under certain conditions, for example, if the D2D terminal is in radio range of a LTE base station. The D2D terminal may fall back to Mode 2 (WTRU autonomous) operation, for example, if it cannot communicate with the LTE base station. In this case, it may mostly use channel access parameters pre-stored on the terminal itself.

For D2D communications using Mode 1, the LTE base station may reserve a selected set of UL subframes to allow for D2D transmissions. The LTE base station may announce a set of UL subframes with associated parameters in which D2D communications for neighbor cells and/or Mode 2 terminals may be received. Less than all LTE system bandwidth (BW) may be available for D2D transmissions in a subframe reserved for D2D. Perhaps when operating in Mode 1, for example, radio resources for D2D communications may be granted to a D2D terminal by the serving cell. The D2D grant front the network may be preceded by an UL transmission by the terminal on the cellular UL, for example, indicating to the base station the amount of available D2D data. The D2D grant received by the D2D terminal from the LTE base station on the cellular DL may allow the D2D terminal to use certain selected radio resources, for example some radio blocks (RBs) occurring in some subframes over a certain scheduling period.

The D2D terminal may transmit a Scheduling Assignment (SA) message in a set (e.g., first set) of one or more D2D subframe(s) and/or transmit the D2D data in a set (e.g., second set) of D2D subframes in a scheduling period. Scheduling assignments (e.g., and others) may contain an identifier field, an MCS field, a resource indicator and TA field. D2D data packets (e.g., and others) may contain a MAC header with source and/or destination address. Multiple logical channels may be multiplexed and/or sent as part of a single transport block (TB) in a D2D subframe by a WTRU.

For D2D communications using Mode 2, the D2D terminals may select (e.g., autonomously select) time/frequency radio resources. Channel access parameters, such as the subframes for use with transmissions of SA control messages and/or corresponding D2D data, scheduling periods or monitoring subframes, may be pre-configured (e.g., typically pre-configured) and/or stored on the D2D terminal. Mode 2 terminals may follow the same or similar transmission behavior as the Mode 1 terminals, for example they may transmit SAs followed by D2D data in scheduling periods. The preceding LT, traffic volume indication and/or DL D2D grant phase might not follow the same or similar transmission behavior as Mode 1 terminals.

For D2D communications in Mode 1 and Mode 2, D2D terminals may transmit auxiliary D2D signals, such as D2D synchronization signals and/or channel messages to aid receivers in demodulating their transmissions.

D2D communications using LTE based radio access may carry voice channels and/or data packets and/or data streams, D2D communications may include D2D discovery service. D2D discovery (e.g., unlike voice channels) may use (e.g., only use) small packet transmissions that may fit in one, two or few (e.g., at most) subframes. For example, these packets may contain application data announcing availability of devices and/or SW applications to participate in D2D data exchanges with terminals in the vicinity.

D2D discovery may or might not use the same or similar channel access protocol, such as may be used for D2D communications for voice and/or generic D2D data. For D2D discovery service, such as when in coverage of an LTE base station, D2D discovery resources may be allocated (e.g., separately allocated) from those used for D2D communications with voice or generic D2D data. Radio resources for D2D discovery messages may be selected (e.g., autonomously) by D2D terminals from a set of resources that may be reserved by the eNB and/or may be recurring (e.g., periodically recurring) time-frequency radio resources in UL subframes (e.g., Type 1 discovery) and/or may be allocated (e.g., explicitly allocated) by the LTE serving cell to the D2D terminals (e.g., Type 2 discovery). The latter may be similar to D2D communications Mode 1. Transmissions of scheduling assignments might not be used when transmitting D2D discovery messages. D2D terminals transmitting (e.g., only transmitting) D2D discovery messages may be used to transmit auxiliary D2D synchronization signals to assist receivers.

Access control, priority handling and/or pre-emption mechanisms for D2D communications using LTE based radio access comparable to conventional LTE networks may be described herein.

D2D terminals, such as those for use with public safety applications, may be (e.g., inherently) designed to operate in absence of operating LTE radio network infrastructure. This may imply that these devices may be able to operate autonomously in terms of channel access and any handling of their D2D data transmissions. Unlike present LTE terminal devices which may be mostly network-controlled through control signaling message exchanges with the LTE network, D2D terminal devices may store (e.g., typically store) some (e.g., most if not all) parameters that may determine their channel access and/or transmission behavior on the (U)SIM card and/or as part of the application software (SW).

Transmission procedures and/or channel access protocols for D2D communications using LTE based radio access might not be designed to allow for random access to distinguish priorities for individual devices and/or to allow for data transmission under consideration of quality-of-service (QoS) for D2D data. A mechanism to deny, to limit and/or to restrict a particular device or user from access to D2D radio resources may exist.

Perhaps when in radio range of an LTE cell, among other scenarios, for example, certain limitations onto allowable UL subframes that may be reserved for use by the D2D terminals in the vicinity may be imposed by the LTE serving cell. Priority handling and channel access by different users or for different types of data transmitted from a given D2D user might not be ensured deterministically. If (e.g., only if) D2D radio resources in the LTE serving cell are over-provisioned, successful channel access for high-priority terminals and successful transmission of higher priority data may be ensured, for example, in the statistical sense. In absence of operating LTE radio network infrastructure, there may be less control over usage of the D2D radio resources.

A D2D terminal might not distinguish between different types of D2D data, for example, for radio resource allocation trade-offs.

D2D communications using LTE based radio access may allow for (e.g., implicit) distinction of different types of D2D communications received, for example, when associating the encryption or message integrity protection keys, and D2D service identifiers used for D2D SW applications to secure D2D data payloads by transmitting devices. When keys and identifiers are known, a transmitting D2D terminal or a receiving D2D terminal might not be able to distinguish higher priority users and/or higher priority type of D2D data, for example, until it may have (e.g., physically) demodulated and/or decoded any such D2D transmission. D2D devices might not take into account priority of ongoing and/or planned D2D communications, for example, when determining their own transmission and/or reception behavior. A D2D terminal ready for transmission might not refrain from channel access, for example, until it has (e.g., physically) demodulated one or more or all the channels, such as in the presence of ongoing critical D2D communications. D2D terminals might not be configured (e.g., never configured) with the knowledge of one or more or all D2D identifiers and/or associated derived payload encryption and/or message integrity protection keys that may be used in the vicinity by other D2D terminals. This means that one or more (e.g., most) D2D terminals may be oblivious to the kind and/or type of D2D data they attempt to decode and distinguish based on the received D2D payload contents. The payload might not be decoded by such a D2D device in the absence of known keys and/or associated identifiers. Information about the carried D2D payload might not be derived.

Mechanisms for D2D communications using LTE radio access technology that may allow for priority based channel access, priority based handling of D2D communications as a function of D2D terminal and/or type of D2D data to ensure service availability and QoS, and/or for pre-emption in critical circumstances may be described herein. Availability of priority based access and/or transmission mechanisms may enhance efficiency of wireless transmissions, improve upon the usage of D2D radio resources and/or may improve upon channel and/or service availability for D2D users, for example, similar to conventional LTE networks.

The term D2D data may refer to D2D related communication between D2D terminals. For example, without loss of generality, D2D data may include data packets such as carrying voice or segments thereof, it may include IP packets or segments thereof, such as used for file download or upload, streaming or bi-directional video, it may include D2D control signaling, or it may include D2D discovery or service or availability messages, etc. The features disclosed herein may be described in the general context of 3GPP D2D communications; the features may be applicable to other features such as D2D discovery, for example.

D2D priority may be based on channel access. One or more (e.g., different) SA and/or data pools may be used for priority-based access. Access mechanisms may be based on radio resource sets (e.g., segregated radio resource sets).

Priority based access for D2D communications may use segregated radio resource sets in time-domain and/or in frequency-domain.

Segregated radio resource sets, in time and/or frequency domain for use with prioritized D2D access may be realized on radio resources that may be used for Scheduling Assignments (SA), D2D data, control or service signaling such as D2D discovery, for one of these D2D data signals/channels, and/or for more than one of these D2D data signals/channels.

Figure 2:
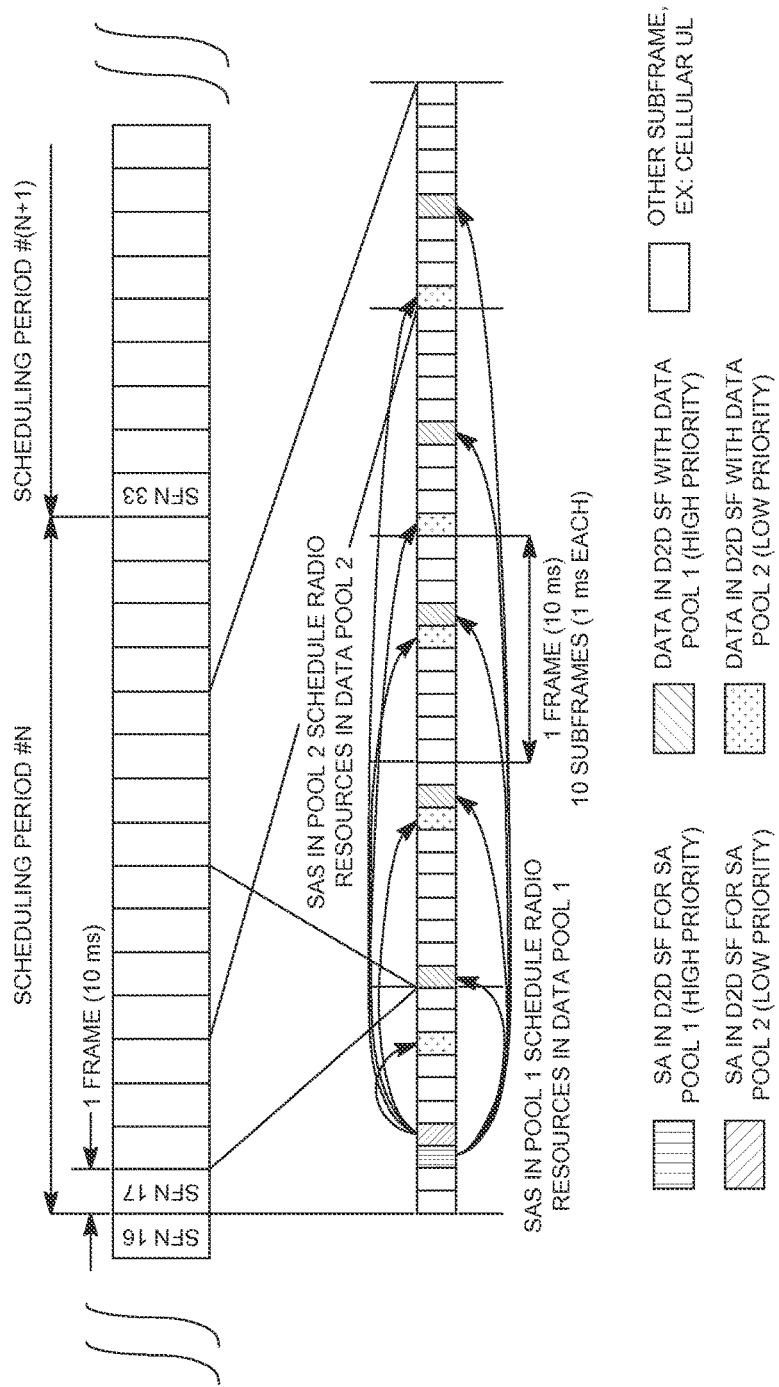
FIG. 2 is an example of priority based access through TDM in the SA and the D2D data subframes.

FIG. 2 is an example diagram of priority based access through TDM in the SA and the D2D data subframes. Priority based access for D2D communications may be realized through Time-Division-Multiplex (TDM) of the SA and/or the D2D data pools.

In the example of FIG. 2, there are N=2 different SA pools and their M=2 corresponding D2D data pools. The 2 different SA pools are defined over different and/or distinct subframe subsets in time-domain. In FIG. 2, there are L1=1 subframe for SAs per SA pool per scheduling period of P=160 ms. The two D2D data pools may be defined over different and/or distinct subframe subsets. In FIG. 2, there are L2=18 available subframes per D2D data pool per scheduling period.

An SA pool (e.g., such as the first SA pool in FIG. 2) may carry SAs for accompanying D2D data transmissions (e.g., high priority D2D data transmissions) in the D2D data pool (e.g., first D2D data pool) over the duration of a scheduling period. High priority transmissions may correspond to a responder talk group (e.g., first responder talk group) and/or a high-priority voice channel. An SA pool (e.g., such as the second SA pool in FIG. 2) may carry SAs for corresponding lower priority D2D transmissions in a D2D data pool (e.g., second D2D data pool). A lower priority transmission may be a background file download and/or a non-time critical exchange of D2D service data.

High-priority D2D data transmissions may be done (e.g., only done) on radio resources used by the SA (e.g., first SA in FIG. 2) and/or the corresponding D2D data pool (e.g., first D2D data pool in FIG. 2). Lower priority D2D data transmissions may occur (e.g., only occur) on the radio resources used for the SA (e.g., second SA) and/or D2D data pool (e.g., second D2D data pool). An SA carried in a subframe of the high-priority (e.g., first) SA pool might not announce D2D data on radio resources for the low priority (e.g., second) D2D data pool. An SA carried in a subframe of the low-priority (e.g., second) SA pool might not announce D2D data on radio resources for the high priority (e.g., first) D2D data pool.

TDM in lower priority D2D transmissions might not be able to occur on the higher priority SA/data pools, which may improve priority handling for D2D transmissions. For network controlled radio resource allocation of the SA and/or D2D data on the high priority pool(s), the low priority D2D devices and channels might not compete for the segregated TDM radio resources. For WTRU autonomous contention resolution on such SA/data resources, the low priority D2D devices and channels might not compete for the segregated TDM radio resources. For random radio resource selection of SA/data by D2D terminals, the low priority D2D devices and channels might not compete for the segregated TDM radio resources. Higher priority D2D data may have a (e.g., significantly) higher chance of being transmitted successfully during initial determination of radio resources and/or during an ongoing transmission due to reduced interference from lower priority D2D data. Legacy D2D terminals incapable of priority handling may be prevented from accessing the new higher priority SA/data pools through resource segregation.

Figure 3:
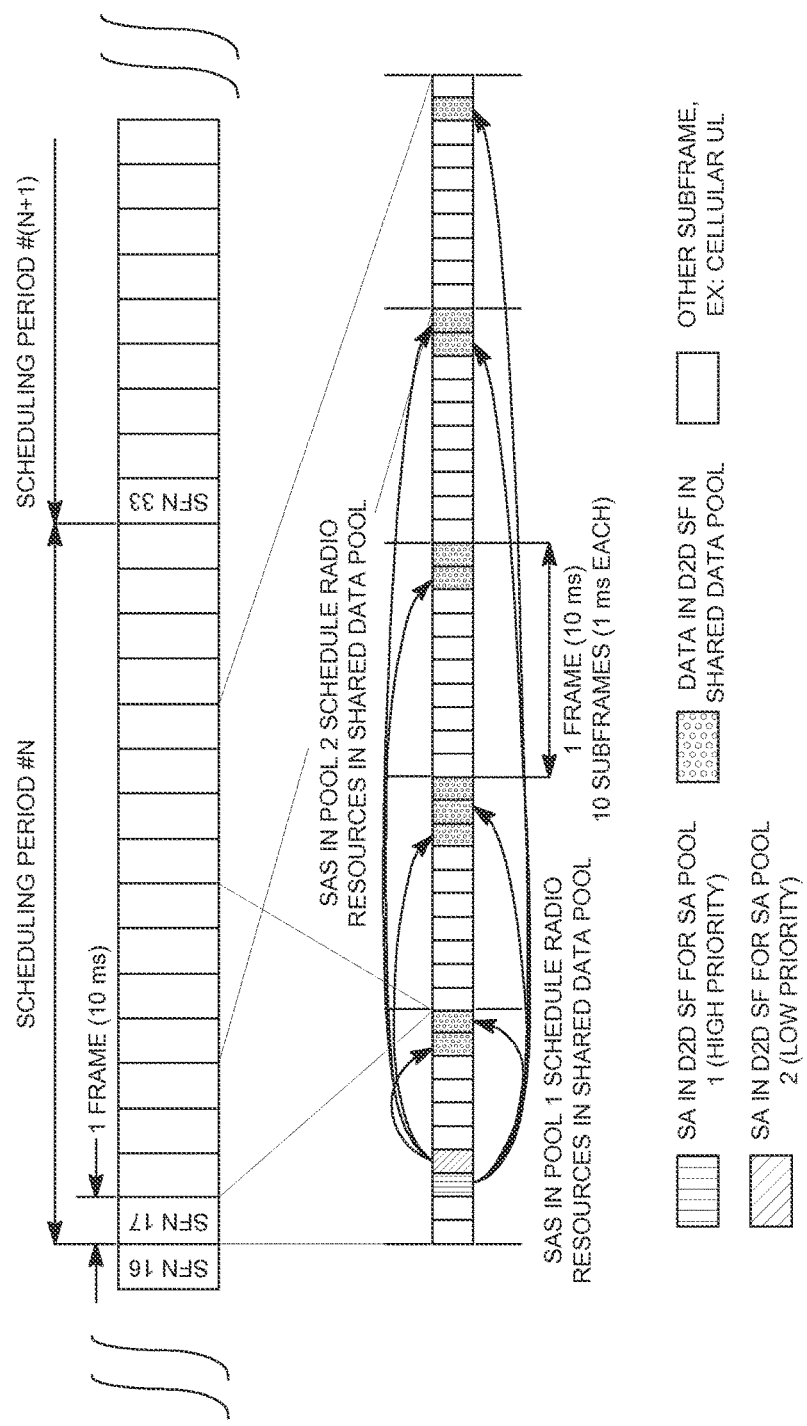
FIG. 3 is an example of priority based access for D2D communications through TDM of SA in shared D2D data subframes.

FIG. 3 is an example diagram of priority based access for D2D communications through TDM of SA in shared D2D data subframes. Priority based access for D2D communications may be realized through Time-Division-Multiplex (TDM) of the SA pools, such as while using shared D2D data pool(s).

In FIG. 3, there are N=2 different SA pools and M=1 corresponding D2D data pool. The two different SA pools may be defined over different and/or distinct subframe subsets in time-domain. In FIG. 3, there are L1=1 subframe for SAs per SA pool per scheduling period of P=160 ms. The D2D data pool has L2=38 available subframes per scheduling period.

The SA pool (e.g., first SA pool in FIG. 3) may carry SAs for accompanying high priority D2D data transmissions. The SA pool (e.g., second SA pool in FIG. 3) may carry SAs for accompanying lower priority D2D transmissions.

High-priority D2D data transmissions may be transmitted by (e.g., only by) using radio resources from the high-priority SA pool (e.g., first SA pool). Lower priority D2D data transmissions may (e.g., may only) be transmitted by using radio resources used for the lower-priority SA pool (e.g., second). SAs from either the high-priority SA pool (e.g., first SA pool) and/or the lower-priority SA pool (e.g., second) may correspond to D2D data transmitted on the shared radio resources of the D2D data pool.

Priority handling for D2D transmissions may be improve. For example, priority handling or D2D transmissions may be improve if lower priority D2D transmissions might not occur on the higher priority SA pools. For network controlled radio resource allocation of the SA on the high priority pool(s), the low priority D2D devices and channels might not compete for such segregated TDM radio resources. For WTRU autonomous contention resolution on such SA resources, the low priority D2D devices and channels might not compete for such segregated TDM radio resources. For random radio resource selection to determine the SA by D2D terminals, the low priority D2D devices and channels might not compete for such segregated TDM radio resources. Higher priority D2D data may have a (e.g., significantly) higher chance of being transmitted, for example, due to avoidance of interference and/or contention on the SA radio resources. Priority based access mechanisms may be implemented while preserving the principle and/or resource utilization (e.g., inherent resource utilization) efficiency of shared D2D data pools.

Figure 4:
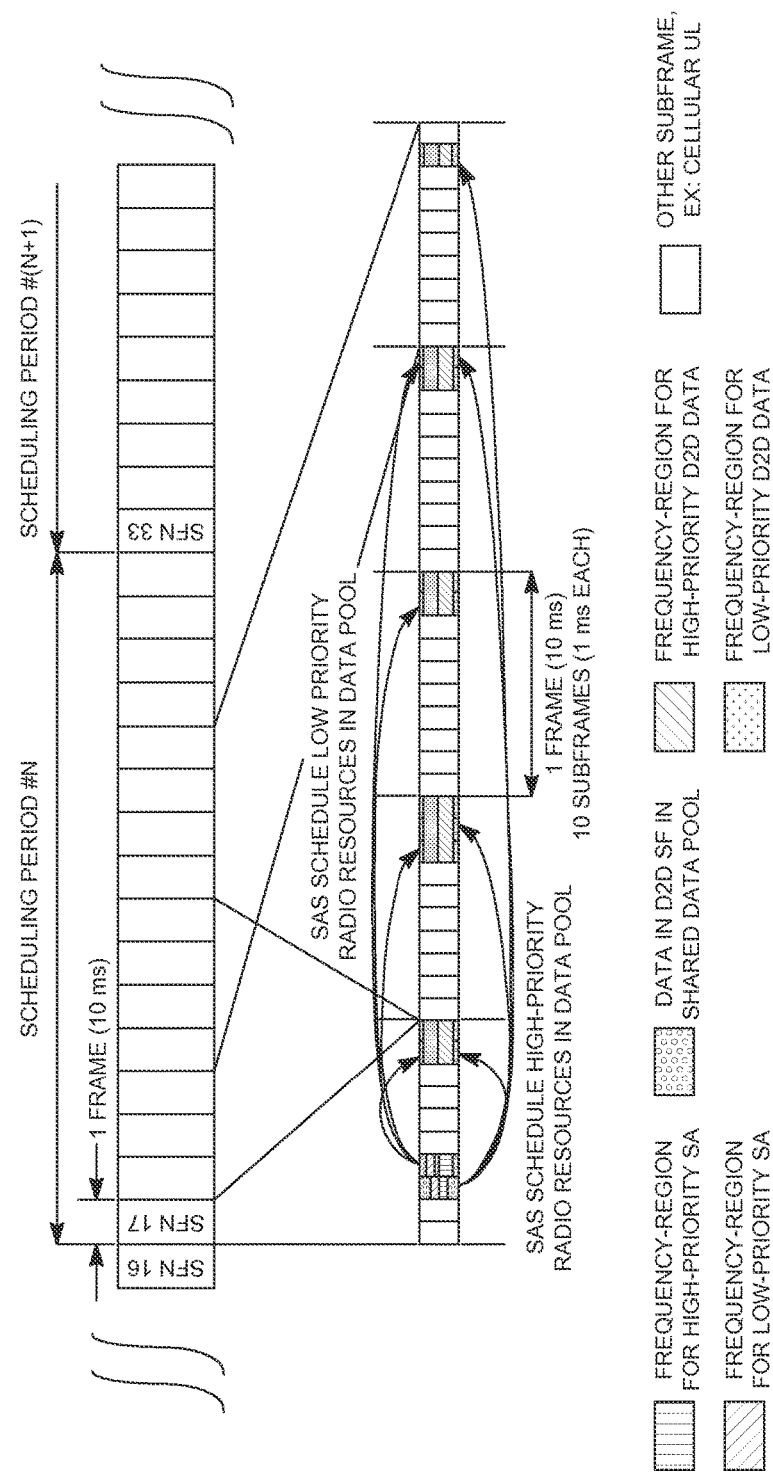
FIG. 4 is an example of priority based access for D2D communications through FDM in the SA and the D2D data subframes.

FIG. 4 is an example diagram of priority based access for D2D communications through FDM in the SA and the D2D data subframes. Priority based access for D2D communications may be realized through Frequency-Division-Multiplex (FDM) of the SA and/or the D2D data pools.

In the example in FIG. 4, there are N=1 SA pool in time-domain and M=1 corresponding D2D data pool in time-domain. In FIG. 4, there may be L1=2 subframes for the SA per SA pool per scheduling period of P=160 ms. In FIG. 4, there are L2=38 available subframes in the D2D data pool per scheduling period. The radio resources in the SA pool contain L2=2 different and distinct radio block subsets in frequency-domain. A subframe containing SAs may contain SAs for high priority D2D data transmission in RBs 10-30, and SAs for low priority D2D data in RBs 40-60. Subframes containing D2D data may contain high-priority and/or low priority transmissions (e.g., only) in RBs 10-30 and RBs 40-60 (e.g., respectively). These may be referred to as SA and D2D data pools in frequency-domain.

The frequency-domain SA pool (e.g., first frequency-domain SA pool in FIG. 4) may carry SAs for accompanying high priority D2D data transmissions in the frequency-domain D2D data pool (e.g., first frequency-domain D2D data pool in FIG. 4), for example, over the duration of a scheduling period. The frequency-domain SA pool (e.g., second frequency-domain SA pool in FIG. 4) may carry SAs for accompanying lower priority D2D transmissions in the frequency-domain D2D data pool (e.g., second frequency-domain D2D data pool in FIG. 4).

High-priority D2D data transmissions may (e.g., may only) be conducted on radio resources in frequency domain, such as frequency domain used by the SA (e.g., first SA) and/or the corresponding D2D data pool (e.g. first D2D data pool). Lower priority D2D data transmissions may (e.g., may only) occur on the radio resources used for the SA (e.g., second SA) and/or the data pool (e.g., second data pool) in frequency-domain. For example, an SA carried in a subframe of the high-priority SA frequency-domain (e.g., first SA frequency-domain) might not announce D2D data on radio resources used with the low priority D2D data (e.g., second D2D data) frequency-domain. An SA carried in the low-priority frequency-domain SA region might not announce D2D data on radio resources in the high priority D2D data frequency-domain (e.g., first D2D data frequency-domain) region.

Priority handling for D2D transmissions may be improved, for example, when lower priority D2D transmissions might not occur on the higher priority SA/data frequency-domain pools. Low priority D2D devices and/or channels might not compete for the segregated FDM radio resources. Higher priority D2D data may have a chance (e.g., significantly higher chance) of being transmitted during determination of radio resources and/or during an ongoing transmission, such as a transmission due to reduced interference from lower priority D2D data.

Figure 5:
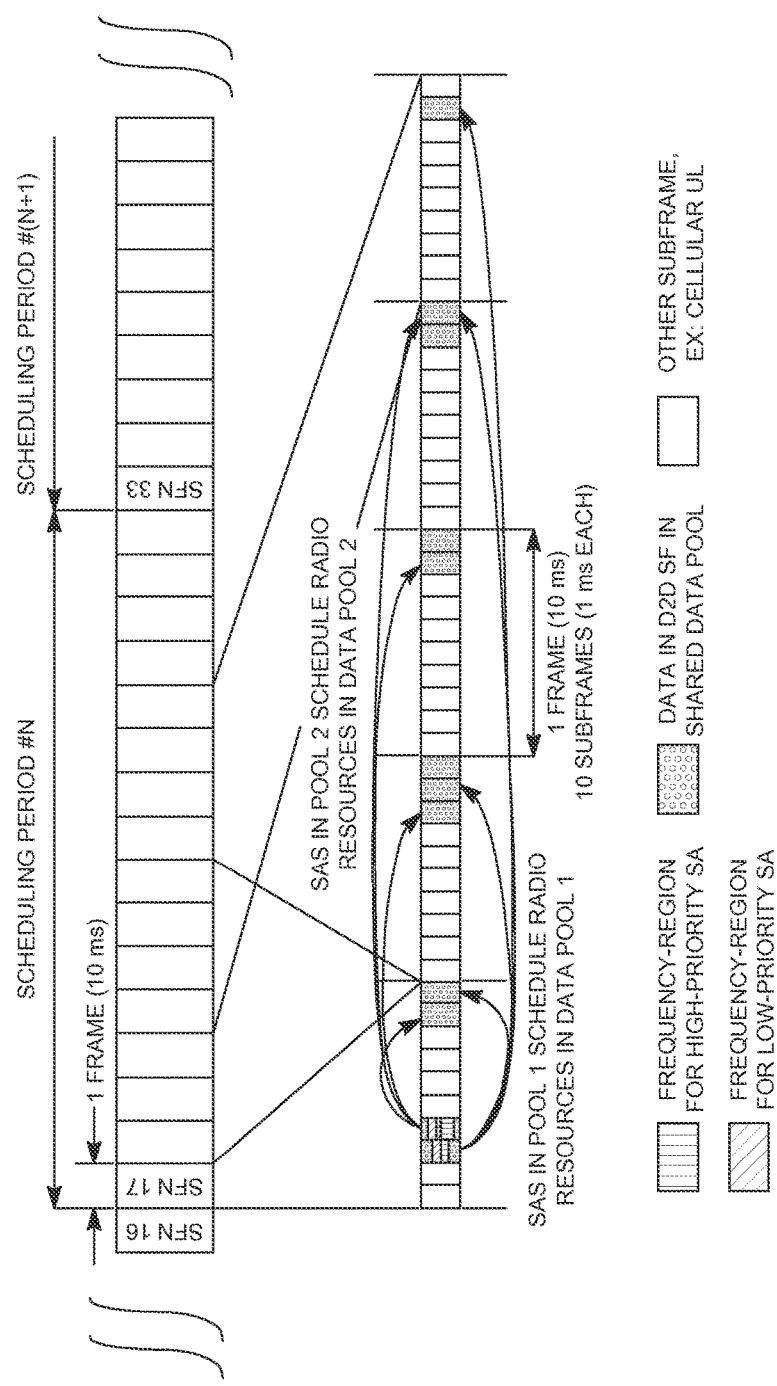
FIG. 5 is an example of priority based access for D2D communications through FDM of SA in shared D2D data subframes.

FIG. 5 is an example diagram of priority based access for D2D communications through FDM of SA in shared D2D data subframes. Priority based access for D2D communications may be realized through Frequency-Division-Multiplex (FDM) of the SA pools while using shared D2D data pool(s).

In FIG. 5, there is N=1 SA pool in time-domain and M=1 corresponding D2D data pool in time-domain. In FIG. 5, there are L1=2 subframes for SAs per scheduling period of P=160 ms. In FIG. 5, there are L2=38 available subframes in the D2D data pool per scheduling period. The radio resources in the SA pool may include L2=2 different and/or distinct radio block subsets in frequency-domain. A subframe containing SAs may contain. SAs for high priority D2D data transmission in RBs 10-30, and SAs for low priority D2D data in RBs 40-60. These may be referred to as SA pools in frequency-domain. Subframes containing D2D data may include high-priority and/or low priority transmissions, such as where designated in one or more (e.g., all) RBs.

The frequency-domain SA pool (e.g., first frequency-domain SA pool in FIG. 5) may carry SAs for accompanying high priority D2D data transmissions, such as in the D2D data pool over the duration of a scheduling period. The frequency-domain SA pool (e.g., second frequency-domain SA pool in FIG. 5) may carry SAs for the accompanying lower priority D2D transmissions, for example, in the D2D data pool.

High-priority D2D data transmissions may (e.g., may only) be transmitted by using radio resources from the high-priority SA pool (e.g., first SA pool) in frequency-domain. Lower priority D2D data transmissions may (e.g., may only) be transmitted by using radio resources used for the lower-priority SA pool (e.g., second SA pool) in frequency-domain. SAs from the high-priority SA pool (e.g., first SA pool) and/or the lower-priority SA pool (e.g., second SA pool) in frequency-domain may correspond to D2D data transmitted on the shared radio resources of the D2D data pool.

Priority handling for D2D transmissions may be improved. For example, priority handling for D2D transmission may be improved when lower priority D2D transmissions might not occur on the higher priority SA radio resources in frequency-domain. For network controlled radio resource allocation for SA on the high priority pool(s), the low priority D2D devices and/or channels might not compete for such segregated FDM radio resources. For contention resolution on such SA resources, the low priority D2D devices and/or channels might not compete for such segregated FDM radio resources. For random radio resource selection to determine the SA by D2D terminals, the low priority D2D devices and/or channels might not compete for such segregated FDM radio resources. Higher priority D2D data may have a chance (e.g., significantly higher chance) of being transmitted, for example, due to avoidance of interference and/or contention on the SA radio resources. Priority based access mechanisms may be implemented, for example, while preserving the principle and resource utilization (e.g., inherent resource utilization) efficiency of shared D2D data pools.

Priority based access for D2D communications may be realized through TDM and/or FDM of the SA and/or the D2D data pools. The resource pools for (e.g., both) the SA and the D2D data may be segregated in frequency and/or time.

Priority based access for D2D communication may be realized through TDM and/or FDM of the SA pools, for example, while using shared D2D data pools.

Examples described herein may be extended to the cases of more than two priority classes with SA or data pools in either time- and/or frequency-domain. For example, N=M=4 priority categories corresponding to four different and/or distinct subframe subsets for SAs and data may be used. Radio resource segregation using TDM or FDM may be extended to the case of more than L1=1 subframes allowed for SA per pool per scheduling period. Different lengths of scheduling periods may be used. SA transmissions may correspond to D2D data transmitted in a later scheduling period and/or in multiple scheduling periods. For example, independently or in conjunction with scheduling periods, principles of semi-persistent, time-limited and/or dynamically granted D2D data transmissions may be used with TDM and/or FDM principles. Time and/or frequency resources might not be contiguous. The examples of SA and D2D data may be used for illustration purposes. The principles of TDM and/or FDM radio resource segregation may be equally described when using different D2D channels or signaling messages. For example, D2D discovery messages may be separated in TDM from D2D control signaling.

Transmission opportunities may be determined, for example, by the following.

D2D transmission opportunities for D2D priority based access using full or partially segregated TDM/FDM radio resources may be advertised by a controlling device. The controlling device may be a D2D terminal and/or an LTE radio network device, such as a base station.

A controlling device may signal a set of radio resources (e.g., first set f radio resources) to be used for high priority D2D data transmissions. A controlling device may signal a set of radio resources (e.g., second set of radio resources) to be used for lower priority D2D data transmissions. Radio resource sets may distinguish between different types of D2D data and/or control or service messages. Radio resource sets may include different parameter sets for different types of signaling. The controlling device may signal different sets of resources and/or, for one or more, or each, set of resources, it may signal the associated priority levels (e.g., or access classes) that may be allowed to use the corresponding resources.

The controlling device may (e.g., explicitly) signal those radio resource sets by using a shared control channel, such as a BCH or PD2DSCH broadcast channel. For example, system information on BCH may contain a combination of either one or both of subframe number or subframe sets, or radio frequency resources in combination or association with access priority level(s). Such D2D access and/or priority levels may be given (e.g., explicitly). Such D2D access and/or priority levels may be derived (e.g., implicitly), for example, on the order in which they may be communicated. Such D2D access and/or priority levels may be given as part of an index list.

D2D transmission opportunities for D2D priority based access using full or partially segregated TDM/FDM radio resources may be derived by D2D terminals, for example, from observing and/or decoding known transmission formats and/or reference signals.

A controlling device may set up corresponding radio resource sets in support of D2D priority based access for use in its vicinity. For example, the controlling device may transmit a D21) signal (e.g., first D2D signal) using a transmission format (e.g., first transmission format) in a time/frequency resource (e.g., first time/frequency resource) for high priority access. The controlling device may transmit a D2D signal (e.g., second D2D signal) using a transmission format (e.g., second transmission format) in a time/frequency resource (e.g., second time/frequency resource) for lower priority access. The D2D signal (e.g., first D2D signal) may be an SA using a payload field and/or code point to indicate high priority. The D2D signal (e.g., second D2D signal) may be distinguished from another D2D signal (e.g., the first D2D signal) through its LI transmission format, such as the choice of pilot symbols and/or encoding sequence(s). A D2D terminal intending to transmit and/or receive D2D data may determine access and/or priority levels for time- and/or frequency resources (e.g., implicitly) by observing such transmissions from another D2D terminal indicating and/or characterizing high and low priority radio resources from the controlling device. The controlling device may determine the relationship between observed D2D signals and/or the used time-/frequency resources. The D2D terminal may establish a list and/or database that may be representative of transmission opportunities for high or low priority D2D data obtained from the occurrences of observed signals.

D2D transmission opportunities in time or frequency domain for D2D priority based access using full or partially segregated TDM/FDM radio resources may be derived by D2D terminals from timing relationship(s), for example, with respect to known and/or observable reference signal(s).

For example, such a reference signal may be the occurrence(s) of a timing and/or frequency acquisition signal, such as D2DSS, DL Sync Signals, or PD2DSCH. A receiving D2D terminal may determines occurrence(s) of such a reference signal. A receiving D2D terminal may compute expected occurrences in time-domain of transmission opportunities for high or low priority D2D data. Timing relationships may be implemented and/or given through a formula, for example, using an index or counter representative of time as one parameter, such as SFT. Timing relationships may be given by a bitmap and/or tabulated set of values. For example, high priority D2D transmission opportunities may be given in every 8th and 9th subframe, beginning from measured occurrences of a D2DSS from a transmitter, while low priority transmission opportunities may be given in every 12th subframe, while being offset by 3 subframes from a first D2DSS occurrence.

Examples described herein may be extended to the use of more than two priority classes, or to the use of different timing relationships or different signaling format representations.

Access mechanisms may be based on the use of radio resource transmission parameters.

Priority based access for D2D communications may be realized through the use of different radio resource transmission patterns (RRPTs) for D2D data in time- and/or frequency-domain, for example, where RRPTs for use with high or low priority D2D data may be characterized by different allocation densities in time/frequency domain over a given time period.

Prioritized D2D access using different radio resource transmission patterns may be realized on radio resources used for scheduling assignments (SA), data, control or service signaling such as D2D discovery, for any one of the D2D data signals/channels, or for one or more (e.g., some) of these D2D data signals/channels in conjunction.

Figure 6:
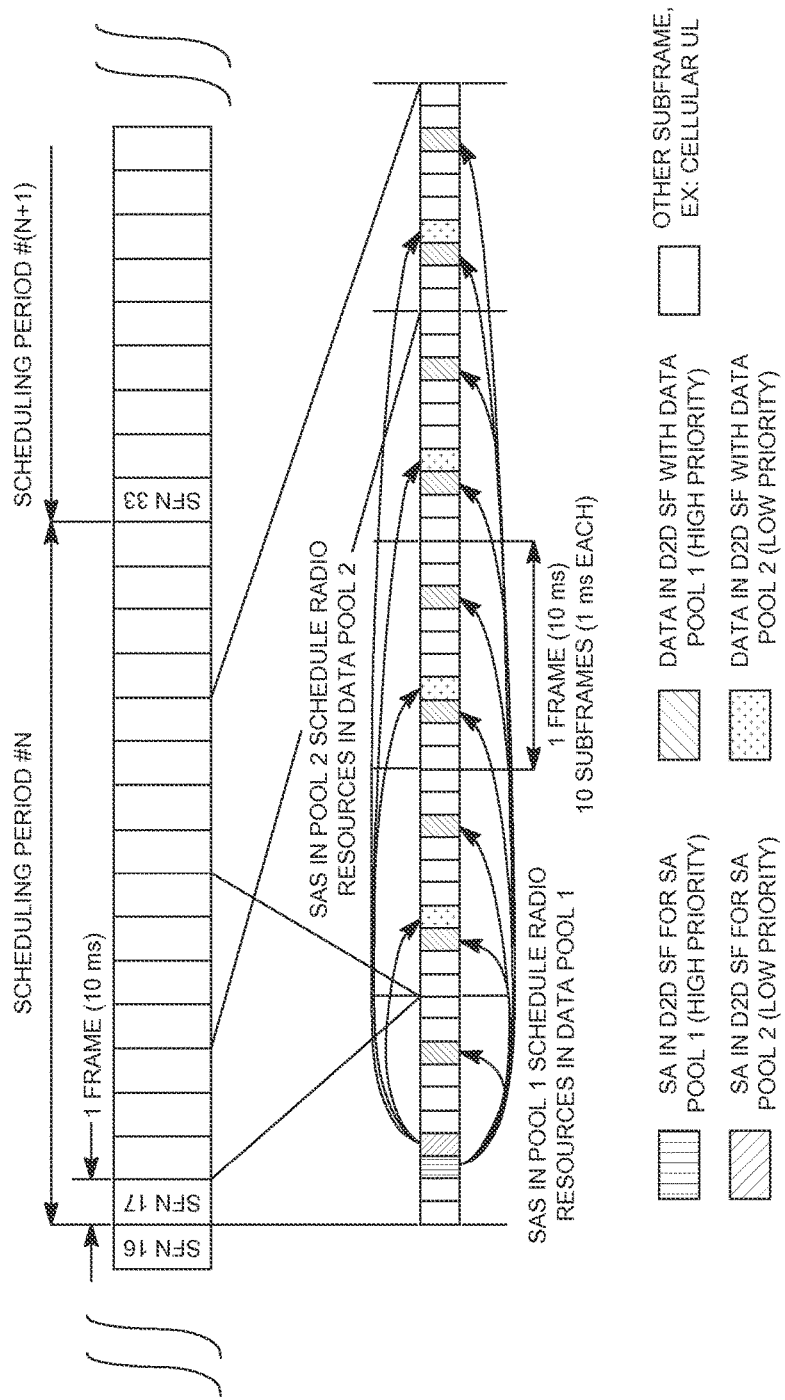
FIG. 6 is an example of priority based access through different resource allocation densities for D2D subframe pools (for example, TDM).

FIG. 6 is an example diagram of priority based access through different resource allocation densities for D2D subframe pools, such as TDM. In FIG. 6, different numbers of subframes per scheduling period may be allocated and/or configured with time-domain segregated resources for SA and D2D data for high- and low priority D2D data (e.g., respectively).

In FIG. 6, a radio resource transmission (e.g., first radio resource transmission) pattern (RRTP) may be configured for high priority D2D data allowing for 31 D2D data subframes per scheduling period of 160 ms, while a (e.g., second) RRTP for low prior D2D data allowing for 15 subframes per scheduling period may be used.

The high-priority SA pool (e.g., first SA pool in FIG. 6) and/or corresponding D2D data pool may allocate a different amount of radio resources per time period, for example one scheduling period, than the low-priority SA pool (e.g., second SA pool in FIG. 6) and/or corresponding D2D data pool (e.g., almost twice as much).

Priority handling for D2D transmissions may be improved, for example, in that for the same resource usage efficiency per D2D transmission, lower priority D2D transmissions may take longer to complete than high priority D2D data transmissions. High priority D2D data transmissions may make use of more resource allocation space in time and/or frequency (e.g., a "bigger pipe"), which may improve their time to complete transmissions and/or improve upon their observable signal to noise and/or interference ratios (SINR), such as when compared to the (e.g., second) low priority SA and D2D data pools.

As shown in FIG. 6, time-multiplexed SA and D2D data resources may be extended to TDM and may be applied to SA radio resources while (e.g., only while) using shared D2D data pool(s). The example shown in FIG. 6 may be extended to frequency-domain allocations for the SA or the D2D data pools, or both.

The example shown in FIG. 6 may be adjusted, for example, by allowing for radio resource densities in time to be adjusted for different transmission characteristics that may be expected for the high priority SA (e.g., first high priority SA in FIG. 6) and D2D data pools when compared to those used for the low priority D2D (e.g., second low priority D2D in FIG. 6) transmission opportunities. For example, if high priority D2D data mainly consists of voice broadcast channels occupying 3 PRB's per subframe for which 5 total transmissions per 20 ms period may be used to sustain an operating SINR of 0-1 dB for BLER at target levels 2-4%, while low priority D2D data consists of D2D discovery using 2 PRB's and no repetitions to attain detection reliability against an operating SINR of 5 dB, then the SA and data pool (e.g., first SA and data pool) may be over-dimensioned in an order approach (e.g., first order approach), such as by taking (e.g., only taking) the number of expected re-transmissions into account for the same or similar amount of offered traffic, adjusted by an over-provisioning factor for higher priority traffic, as desired.

Figure 7:
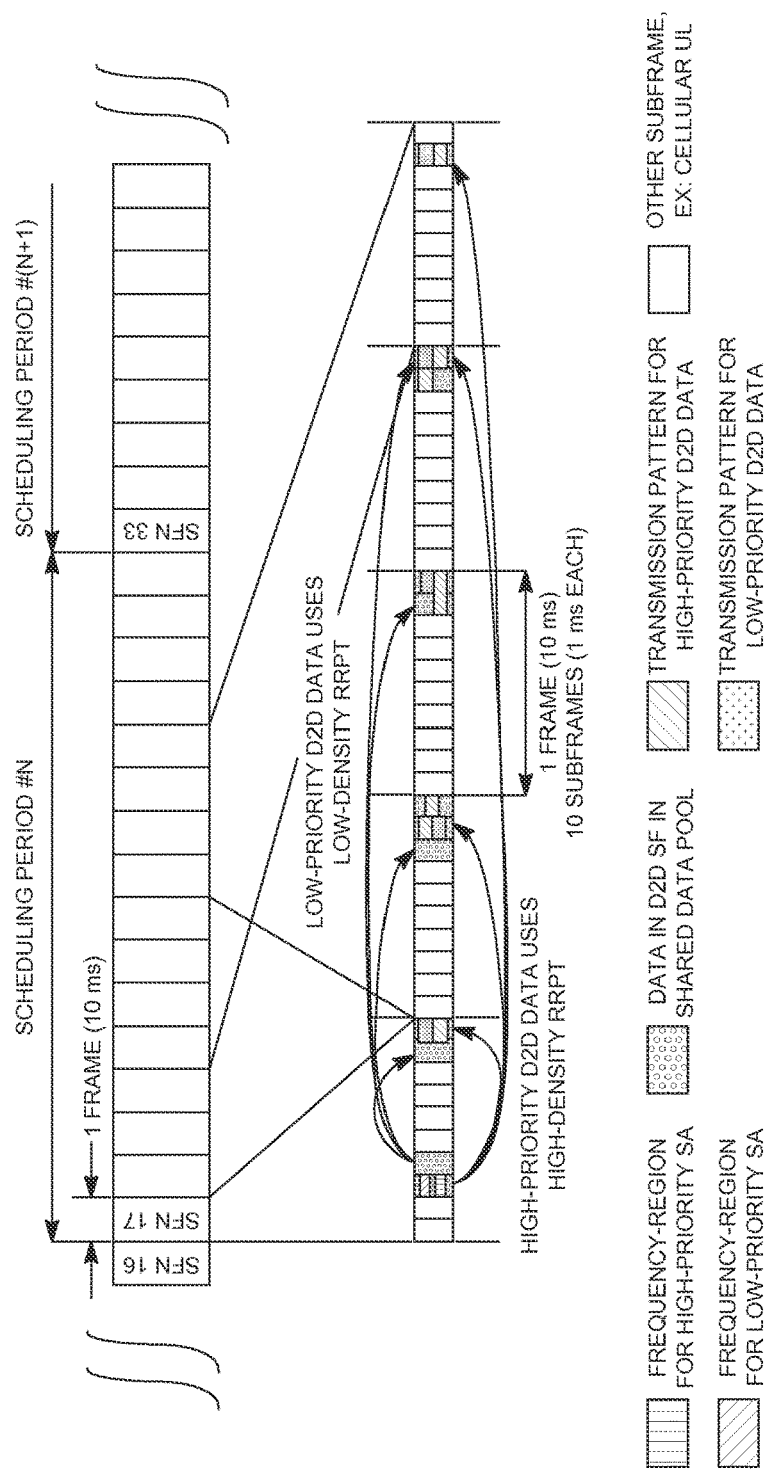
FIG. 7 is an example of priority based access through different resource allocation densities (for example, Transmission Patterns).

FIG. 7 is an example diagram of priority based access through different resource allocation densities (e.g., transmission parameters). In FIG. 7, different numbers of subframes per scheduling period may be used by a D2D terminal with time-domain segregated resources for SA and D2D data, such as while transmitting high- and low priority D2D data (e.g., respectively).

A radio resource transmission pattern (RRTP) (e.g., first RRTP in FIG. 7) may be used by the D2D terminal for high priority D2D data, while the D2D terminal may use a different RRTP (e.g., second different RRTP in FIG. 7) for low priority D2D data.

In FIG. 7, a shared D2D data pool may be configured. A D2D transmitter intending to send high-priority D2D data, such as voice, may send an SA indicating a, RRTP (e.g., first RRTP) that may result in the use of 28 subframes over the Scheduling Period of 160 ms. For the transmission of lower priority D2D data, such as D2D signaling, the D2D transmitter may use a distinct or different RRTP (e.g., second RRTP in FIG. 7) that may result in the use of 19 subframes (e.g., only 19 subframes) over that same Scheduling Period.

The high-priority RRTP (e.g. first high-priority RRTP in FIG. 7) and/or the low priority RRPT (e.g., second low priority RRPT in FIG. 7) may allocate different amounts of radio resources per time period, such as one scheduling period.

Priority handling for D2D transmissions may be improved, for example, in that for the same resource usage efficiency per D2D transmission, lower priority D2D transmissions may take longer to complete than high priority D2D data transmissions. A D2D transmitter device may select (e.g., autonomously select) the amount of radio resources used to transmit D2D data, for example, corresponding to the case of high versus low priority D2D data. Shared D2D data pools may be used any may improve upon resource utilization and efficiency.

In FIG. 7, time-multiplexed SA and D2D Data resources may be extended to frequency-domain allocations for the RRPTs applied to the SA or the D2D data pool(s).

Time- and frequency domain allocations may be combined through the radio resource transmission patterns, for example, to achieve different allocation densities over a given time period. This may be extended to account for different transmission characteristics of D2D data, for example, as described herein.

Examples described herein (e.g., with respect to FIG. 6 and FIG. 7) may be extended to the cases of more than two priority classes with SA or data pools in either time- or frequency-domain. For example, N=M=4 priority categories corresponding to 4 different and distinct radio resource transmission patterns may be used. Different lengths of scheduling periods may be used. SA transmissions may correspond to D2D data transmitted in later and/or multiple scheduling periods. Independently or in conjunction with scheduling periods, principles of semi-persistent, time-limited of dynamically granted D2D data transmissions may be used with above described principles of different radio resource transmission densities per time period. While the examples used SA and D2D data for illustration purposes, the principle of radio resource transmission densities per time period may be equally described when using different D2D channels or signaling messages to implement priority based access.

D2D transmission opportunities for D2D priority based access using different radio resource transmission patterns (RRPTs) for D2D data may be advertised by a controlling device. RRPTs for use with high or low priority D2D data may be characterized by different allocation densities in time/frequency domain, such as over a given time period. The controlling device may be a D2D terminal. The controlling device may be an LTE radio network device, such as a base station.

A controlling device may signal a set of radio resources (e.g., first set of radio resources) with a (e.g., first) radio resource allocation density over a time period for use with high priority D2D data transmissions. A controlling device may signal a set of radio resources (e.g., second set of radio resources) with a different radio resource (e.g., second different radio resource) allocation density over a time period for use with lower priority D2D data transmissions.

The controlling device may (e.g., explicitly) signal those radio resource sets, for example, by using a shared control channel, such as a BCH or PD2DSCH broadcast channel. System information on BCH may contain a combination of one or both of subframe number or subframe sets, or frequency resources in combination, or association with access priority level(s). Such D2D access and priority levels may be given (e.g., explicitly), may be derived (e.g., implicitly) on the order in which they are communicated, may be given as part of an index list, or may be derived by the order in which they are communicated.

D2D transmission opportunities for D2D priority based access may be determined by a transmitting D2D terminal, for example, in the form of distinct radio resource transmission patterns (RRPTs) for D2D data, such as where the RRPTs for use with high or low priority D2D data may be characterized by different allocation densities in time/frequency domain over a given time period.

A D2D transmitter device intending to transmit D2D data may (e.g., first) determine whether its D2D data corresponds to the category of high priority data or to low priority data.

The D2D transmitter may determine the corresponding SA and/or data radio resources for use with its D2D data transmission, for example, as an outcome of the determination of priority. The D2D transmitter device may select an RRPT (e.g., first RRPT) to be used for high priority D2D data, or an RRPT (e.g., second RRPT) to be used for low priority data, such as where the RRPTs are characterized by different allocation densities in time/frequency domain over a given time period. The D2D transmitter may transmit SA and/or D2D data on the determined radio resources. Transmission of SA and D2D data may terminate, for example, when there is no more data to transmit. A re-evaluation and/or determination of appropriate radio resources may be conducted, for example, when there may be a change to radio resources allowed for the high or low priority SAs, or when a new scheduling period begins.

A D2D receiver device intending to decode D2D data may determine SA and/or data radio resources. The D2D receiver may determine whether high priority or low priority D2D transmissions may be received on the corresponding radio resources. The D2D receiver may determine a radio resource transmission pattern (RRTP) that may be representative of the access priority of D2D data, such as may be indicated or decoded or derived from the D2D signal transmission. As a function of the RRTP, the D2D receiver may attempt to decode and/or demodulate at least the subset of radio resources, for example, as a function of the determined parameters.

Different radio resource transmission patterns (RRPTs) for D2D data using prioritized access may be determined by a transmitting D2D terminal, for example, from timing relationship(s). RRPTs for use with high or low priority D2D data may be characterized by different allocation densities in time/frequency domain, for example, over a given time period.

For example, when using a reference signal to determine timing parameter(s), these may be the occurrence(s) of a timing and/or frequency acquisition signal, such as D2DSS, DL Sync Signals, or PD2DSCH. A transmitting D2D terminal may determines an RRPT (e.g., first RRPT), such as a baseline pattern with respect to the occurrence(s) of the timing reference. The transmitting D2D terminal may determine an adjusted RRPT (e.g., second adjusted RRPT) for use for its D2D transmission, for example, by using the determined RRPT as an input (e.g., first input) and a parameter whether D2D data is high or low priority as an input (e.g., second input). Timing relationships may be implemented or given through a formula using an index or counter representative of time as one or more parameters, such as SFN. Timing relationships may be given by a bitmap or tabulated set of values. For example, high priority D2D transmission opportunities may be determined from a baseline RRPT pattern resulting in transmission in every fourth subframe, beginning from measured occurrences of a D2DSS from a transmitter, while low priority transmission opportunities may be determined (e.g., only) for every 12th subframe, while being offset by three sub-frames from a first D2DSS occurrence.

Examples described herein may be extended to the use of more than two priority classes, or the use of different timing relationships.

Access mechanisms may use guaranteed segregated resources for high priority devices.

The priority access may be performed by guaranteeing and/or potentially reserving a set of resources that may be used by higher priority data transmissions. The resources may correspond to a set of time/frequency resources for SA and/or data pools (e.g., including a set of patterns). Higher priority WTRUs may have guaranteed access to these resources, Lower priority WTRUs may use the high priority reserved data resources, for example, if those resources are not being used by high priority data.

The SA resource pools may be segregated in time and/or frequency for different priority access WTRUs and/or data transmissions. For example, the first N SA subframes in a scheduling period may correspond to subframes that may be used by (e.g., only by) devices transmitting high priority data and/or devices that may be high priority devices.

A WTRU may monitor the resources (e.g., SA resource/subframes) configured for transmission of data with higher priority than the available data in the WTRU. The WTRU may monitor the subframes reserved for higher priority data transmissions.

If the WTRU determines that at least X (e.g., where X may be a configurable number) higher priority scheduling occurrences may be detected on the higher priority SA resources (e.g., in the current or past scheduling period(s), e.g., over a predefined window), the WTRU may transmit the lower priority data on (e.g., only on) the resource pool(s) reserved/configured for the low priority data. If the WTRU determines that at least X higher priority scheduling occurrences may be detected on the higher priority SA resources, the WTRU may transmit (e.g., only transmit) using one or more (e.g., one) of the RRPTs selected from the list of RRPT to be used for low priority data or configured for the priority level of the available data for transmission. This may ensure that, if there is at least one high priority data transmission, the lower priority WTRUs might not attempt to use the resources for higher priority data. If less than X scheduling occurrences are detected, the WTRU may select resources from the data resource pool configured for higher priority data and for lower priority data. If less than X scheduling occurrences are detected, the WTRU may select from the list of RRPTs reserved for higher priority data and for lower priority data.

The WTRU may (e.g., first) decode the SAs transmitted on the high priority SA resources and determine the set of resources or set of RRPTs used by the high priority data. The WTRU may exclude the set of resources or set of RRPTs used by the high priority data from the list of available RRPTs or available resources to use. This may allow a WTRU transmitting lower priority data to make use of resources that might not be used to transmit higher priority data.

4 SA subframes per Scheduling period of 80 ms may be configured for D2D transmissions. The set (e.g., complete set) of SA subframes 1-4 may be used for transmission and/or reception by WTRU s, e.g., for high priority D2D data. The subset of SA subframes 3-4 may be used by WTRUs for low priority D2D data (e.g., only the subset of SA subframes 3-4 may be used by WTRUs for low priority D2D data). A WTRU may (e.g., first) determine whether the D2D data it has to transmit is high or low priority D2D data. If the WTRU determines that its D2D data is low priority, the WTRU may determine whether high priority D2D transmissions by other WTRUs are announced for the Scheduling period from decoding SAs in the 4 available SA subframes. If it finds such high priority SAs, it may extract decoding information and/or determine transmission parameters corresponding to these high priority SAs. The WTRU may determine a set of D2D SA and corresponding D2D data subframes currently in use by other high priority WTRUs. The WTRU may select SA and/or D2D data resources not in use by a determined high-priority WTRU (e.g., all determined high-priority WTRUs) and transmit its own SA. If no available SA and/or D2D data resource can be found, its transmissions may be deferred. If, e.g., as described herein, the WTRU determines that its D2D data is high priority, it may select an available SA and corresponding D2D data resource for its own transmission (e.g., any available SA and corresponding D2D data resource for its own transmission).

In one or more techniques described herein, perhaps for example if the number of high priority WTRU transmissions decoded by the low priority WTRU may be larger than some value N, among other scenarios, the low priority WTRU may behave using one or more of the following:

Transmit on another SA pool and/or data pool in the same scheduling period;
Use the same SA pool, but transmit on another data pool in the same scheduling period;
Use the same SA and/or data pool in the same scheduling period, but transmit using a TRPT and/or time frequency resources for SA that might not be used by any of the high priority WTRUs;
Reduce transmit power in the current scheduling period;
Defer transmission to the next scheduling period and/or some random time in the future; and/or
Start a retransmission timer, which, in some techniques, perhaps after expiry, the WTRU may retry one or more of the aforementioned, for example, among other scenarios.

In some embodiments, for example concerning the SA resources, perhaps to avoid collision of SA resources and/or perhaps to allow SA resources to be more readily accessible by the high priority users, among other scenarios, the SA subframes usable for high priority may occur (partially or completely) first in time (e.g., as compared to the low priority SAs). The SA resources associated to high priority WTRUs and/or those associated to low priority WTRUs may be configured in the WTRUs via signaling (e.g., by being assigned to different SA pools), and/or could be statically configured in one or more, or all, WTRUs.

For example, the set of SA resources (0<=N PUCCH<N2) configured as subframe resources and/or resource blocks for a specific transmit pool could be separated into two sets where 0<=N_PUCCH<N1 may be reserved for the high priority user and N1<=N_PUCCH<N2 may be reserved for the low priority user (e.g., resources in earlier subframes may have smaller or the same N_PUCCH index). Perhaps when the high priority WTRU transmits using the specific pool, the WTRU may randomly select and/or utilize the SA resources reserved for the high priority users (and perhaps in some techniques only such resources).

A WTRU with high priority (e.g., a first priority) may select and/or utilize any SA resource configured for D2D SA transmission in a given scheduling period. A WTRU with low priority (e.g., a second priority) may utilize any SA resources which might not be part of the SA resources reserved for the high priority transmissions. The low priority WTRUs may make such determination by decoding the SAs associated to high priority WTRUs.

For example, the first N1 time frequency blocks which can be chosen by a high priority WTRU may occur (e.g., may always occur) prior in time to the first N2 time frequency blocks which can be chosen by a low priority WTRU. In other words, N1 for the high priority WTRU may be in the set 0<N1<K1, while N2 for the low priority WTRU may be anywhere in N1>N2>K2. For example, the parameters N1, N2, K1, and/or K2 may refer to a time index such as subframe numbers or indices. A first SA pool for high priority WTRU transmissions may be available in subframes numbered from 0 to K1=3. A second SA pool for low priority WTRU transmissions may be available in subframes numbered from 0 to K2=8. Perhaps when a low priority WTRU might not detect a high priority WTRU transmission in subframes N1=0, 1 and/or 2, among other scenarios, it may utilize an SA resource in subframes N2>2. For example, the parameters N1, N2, K1, and/or K2 may refer to a time-frequency index such as identified as numbered and/or indexed RB/subframe time-frequency resources. A first SA pool for high priority WTRU transmissions may be available in subframes numbered from 0 to K1=2 and in 50 RBs per subframe, one or more, or each, yielding 150 indexed RB/subframe time-frequency resources. A second SA pool for low priority WTRU transmissions may be available in subframes numbered from 0 to K2=5 using 20 RBs per subframe, one or more, or each, yielding 120 indexed RB/subframe time-frequency resources. Perhaps for example when a low priority WTRU might not detect a high priority WTRU transmission in the 150 indexed high priority RB/subframe time-frequency resources, among other scenarios, it may utilize an SA resource in the 120 indexed low priority RB/subframe time/frequency resources.

A WTRU with low priority transmissions may use (e.g. at least a part of) the SA resources for a scheduling period which are reserved for high priority WTRUs, perhaps for example after the WTRU with low priority transmissions may determine that these resources might not be used, among other scenarios. For instance, if an SA (initial transmission and/or retransmissions) includes at least 2 distinct time/frequency blocks which are associated together, the WTRU with low priority transmissions, perhaps for example after determining that the first PUCCH transmission may be unused, can use the remaining PUCCH transmission which may belong to the high priority WTRU transmission. The WTRU may transmit with one or more of: fewer repetitions, modified transmit power, and/or reduced MCS. The low priority WTRU, perhaps for example when having determined that there are no transmissions by the higher priority WTRU, among other scenarios, may utilize the SA resources not reserved for low priority WTRUs. Determination of which selection to make may be a random decision, perhaps for example based on some signaled criteria, and/or may be based on channel measurements.

A WTRU may apply the same or different behavior in the example described herein on one or more transmit pools, and perhaps in some scenarios may do so simultaneously. For instance, a low priority WTRU may listen for high priority transmissions in one or more, or multiple, pools perhaps before selecting the pool on which to transmit. Different pools may have different reservation rules for the SA resources between high and/or low priority WTRU transmissions (e.g., a pool 1 may have one or more distinct SA resources for high and/or low priority while pool 2 might not).

Using features described herein, high priority D2D transmissions may have preferential access (e.g., first access) to configured and/or available D2D transmission resources. Low priority D2D transmissions may be selected as a function of these and are may be transmitted if D2D transmission resources are still available. Given that WTRUs may be decoding incoming SA in SA carrying subframes to determine whether they may receive corresponding D2D data as part of monitored talk groups, using available information obtained from decoding SAs to determine which D2D transmission resources are occupied may come at little added decoding complexity.

In some embodiments, specific resources may be reserved for high priority transmissions and/or the high priority WTRUs may transmit an occupancy flag to indicate to the low priority WTRUs that they may use the high priority SAs and/or data resources for a given scheduling period. The occupancy flag may be transmitted as part of the SA (e.g., at the beginning of the SA), and/or could be transmitted in an SA in advance of the target scheduling period, perhaps for example to indicate the occupancy of one or more SA resources in one or mode future scheduling periods. The occupancy flag may be transmitted in a separate channel (e.g. D2DSS and/or PD2DSCH) that may be read by one or more, or all D2D WTRUs. A flag may be associated with a (e.g., a single) SA resource, with a pool and/or resources, and/or with one or more, or all, resources available for transmission of D2D.

For example, 4 SA subframes per scheduling period of 80 ms may be configured for D2D transmissions. A (e.g., a single) occupancy flag associated to subframes 1 and 2 can be set whenever a high priority WTRU may utilize either of these subframes. A low-priority WTRU may wish to transmit SA and/or (e.g., subsequently) data. The WTRU may check for the presence of the occupancy flag, perhaps for example, to determine whether there are any higher priority WTRUs planning to transmit SA for that scheduling period. When the occupancy flag is set, among other scenarios, the lower priority WTRUs may be utilize (e.g., may only utilize) subframes 3 and 4. When the occupancy flag is not set, among other scenarios, the lower priority WTRU can select any SA resource(s) for transmissions.

For example, a high priority WTRU which may have selected, resource(s) on a scheduling period x and/or indicated this using the occupancy flag), may also indicate that it may re-use the same SA resource(s) and/or data (e.g., RRPTs) on the following SA period. In such scenarios, among others, a low priority WTRU might not use the high priority resources for the next two scheduling periods, for example.

A WTRU may be configured (e.g., by the eNB and/or ProSe function) and/or may be pre-configured to be allowed to transmit an occupancy flag that may be destined to the low-priority users. For example, a WTRU may be configured to be used by a "special user" (police chief, fire chief, etc.). A WTRU, perhaps for example under certain circumstances and/or triggers (e.g. an emergency situation), may (e.g., may be allowed) to transmit the occupancy flag. This trigger may allow the WTRU to do so for a period of time, perhaps for example a finite period of time.

In some embodiments, the WTRU may measure and/or determine the signal strength and/or signal occupancy of the set of resources for SA and/or set of RRPTs that may be reserved for the high priority data. The WTRU may transmit (e.g., may only transmit) on those resources, perhaps for example if the signal strength and/or signal occupancy is below some pre-defined and/or known threshold. Measurement may be made at the lime instant and/or scheduling period in which the WTRU may wish to transmit, and/or they may include a measurement made on a past scheduling period and/or averaged over several scheduling periods in the past. The measurement may include a measurement and/or RSSI and/or similar occupancy or interference measurement. The thresholds may be statically defined, and/or they may be configured in the WTRU via RRC signaling and/or via PHY-layer signaling in a D2D Synchronization Channel (PD2DSCH).

For example, 4 SA subframes per scheduling period of 80 ms may be configured for D2D transmissions. The complete set of SA subframes 1-4 may be used for transmission and/or reception by WTRUs for high priority D2D data. The subset of SA subframes 3-4 (e.g., only such a subset) may be used for WTRUs for low priority D2D data. A WTRU may determine whether the D2D data it may wish to transmit is high or low priority D2D data. If the D2D data is low priority, among other scenarios, the WTRU may check the signal occupancy of SA subframe 1 and/or 2. This signal occupancy could be an averaged measurement of RSSI over the last N subframes, for example. If the signal occupancy measure of either of these subframes is below a threshold, the WTRU having low priority data to transmit may select that subframe for transmission. If the occupancy measure is above a threshold, among other scenarios, the WTRU with low priority data to transmit may use subframes 3 and/or 4 for transmission. A WTRU that may determine that it has high priority D2D data to transmit, among other scenarios, may transmit using SA subframe 1 and/or 2, or may transmit on any of the 4 SA subframes.

In some embodiments, there may be different priority levels, correspondingly different SA subframes, and/or different thresholds. A WTRU with the lowest priority level (e.g., out of 4 levels) may check the occupancy measure for one or more, or each, of the 4 subframes, if the occupancy level of any of the 4 subframes is below the corresponding threshold for that subframe, among other scenarios, the WTRU may transmit on any of the subframes where the occupancy level was below a threshold. If none of the SA subframes meets this criteria (e.g., at any time), among other scenarios, the WTRU with low priority data to transmit may defer its transmission to the next SA period and/or may repeat the described techniques.

In one or more techniques, one or more, or a set, of SA and/or data resources may be reserved. High priority WTRUs, perhaps when utilizing such resources, among other scenarios, may transmit with higher power than the low priority WTRUs. WTRUs with high priority transmissions may use (e.g., may be restricted to use) these reserved resources. WTRUs with high priority transmissions may use one or more, or all, resources, perhaps while respecting the transmission power values associated with the high priority WTRUs. WTRUs with low priority transmissions may use one or more, or all, resources (e.g., reserved and/or non-reserved), perhaps while respecting the transmission power values associated with the low priority WTRUs. One or more techniques in which the low priority WTRUs may transmit with lower transmit power on resources reserved for the high priority WTRUs may be used in combination with other techniques described herein.

In one or more of the techniques described herein, the guaranteed segregated resources for the high priority WTRUs may be signaled by the network (e.g., via. RRC, NAS, and/or MAC signaling), and/or could be statically determined and/or defined. They may be defined/determined by the ProSe function. The presence of guaranteed segregated resources may be determined dynamically by one or more, or each, WTRU, perhaps based on one or more rules, and/or might not be the same for all WTRUs. For example, a low priority WTRU may determine that the segregated resources may be present on a given scheduling period, perhaps for example based on measurements made of the current and/or previous scheduling period, and/or current and/or past determination(s) of the presence of high priority WTRUs. For example, low priority WTRUs may respect the rules associated with one or more segregated resources on these scheduling periods, perhaps for example while operating using normal Release 12 rules on scheduling periods where such determination(s) may indicate that there might not be any segregated resources present.

Features described herein may use a specific and/or limited configuration using SA subframes; the operational principle may be extended to D2D subframes other than SA, such as including D2D subframes and/or frequency regions allowed for D2D transmission. Features described herein may be applied for the case of more than 2 priority levels, e.g., more than low and high, e.g., low, medium, and high, a range of priorities, etc. The features described herein (e.g., tiered D2D transmission resources to allow for higher priority WTRUs to use time/frequency resources first, and lower priority WTRUs to choose their own D2D transmission resources in time/frequency after determining (e.g., only after determining) which ones are announced in use by higher priority WTRUs) may be applied to other D2D signals and/or channels other than SA.

Access mechanisms for D2D control and data may be provided.

D2D data transmissions carrying control signaling may be received and/or transmitted by a WTRU in a set of designated time/frequency resources.

D2D control signaling may refer to application layer control messages exchanged between D2D WTRUs for the purpose of floor control, session control, connection establishment and/or similar purposes, e.g., to administer group calls. D2D control signaling may correspond to radio messages used for the purpose of managing D2D connections and reception and/or transmissions in WTRUs. Control signaling at application layer may be a self-contained D2D PDU, or it may be multiplexed with D2D data such as carrying VoIP packets or segments thereof.

A set of designated time/frequency resources for transmission and/or reception of D2D control messages may be obtained from one or more of the following parameters: timing values such as frame or subframe counters; cell-wide or D2D system frame values; timing offset value(s) applied to a reference subframe or frame; offset applied to occurrence(s) of a selected cell-wide or D2D signal or channel; frequency indices, RBs, or group of frequency regions; cell-wide or D2D system or WTRU identifier; group communication identifier; or channel or group index value(s).

Some or all parameters may be pre-configured in the WTRU, or they may be obtained through configuration signaling during system operation, or they may be derived by the WTRU by means of a lookup table or formula or equivalent. The WTRU may derive D2D transmission resources as a limited and/or designated subset of the available D2D transmission resources, e.g., after determining D2D subframes, allowed frequency regions, etc.

The WTRU may transmit or receive a D2D control message in a set of selected and/or reserved subframes that may comprise a subset of possible D2D data subframes. When a scheduling period of 40 ms is used, every 4th scheduling period may include D2D control messages or signaling e.g., for either one, selected or possibly one or more, or each, D2D communication group.

A set of time/frequency transmission patterns may be used for transmission and/or reception of D2D control messages. The set of transmission patterns may be pre-determined and/or fixed, or it may be derived by a D2D WTRU, e.g., as a function of D2D transmission parameters. When 64 possible transmission patterns are obtained following D2D data subframe allocations, the first 7 of those (e.g., only the first 7 of those) may be used for the purpose of transmitting D2D control signaling associated with a D2D communication group. Using features described herein, useful and/or time-critical D2D control signaling may make use of reserved D2D transmission resources in the system, e.g., it might not be interfered or suffer from lack of transmission opportunity when D2D data such as VoIP is concurrently transmitted in the D2D transmission resources.

A D2D transmitter device may transmit D2D data. For examples described herein, a D2D transmitter device intending to transmit D2D data may determine (e.g., first determine) the highest priority data available for transmission and the associated priority level of D2D data. The WTRU may determine the priority level of the WTRU (e.g., a high priority WTRU). The D2D transmitter may determine the corresponding SA and/or data radio resources for use with its D2D data transmission, for example, as an outcome of the determination of priority. The D2D transmitter may transmit SA and/or D2D data on the determined radio resources. The WTRU may determine the D2D data resources it may use, for example, as a function of resources used by higher priority users in the system. Transmission of SA and D2D data may terminate, for example, when there is no more data to transmit. A re-evaluation and/or determination of appropriate radio resources may be done, for example, when there may be a change to radio resources allowed for the high or low priority SAs, or when a new scheduling period may begin or when a time-limited grant may expire.

A D2D receiver device may receive D2D data. A D2D receiver device intending to decode D2D data may determine SA and/or data radio resources. A D2D receiver device may determine whether high priority or low priority D2D transmissions may be received on the corresponding radio resources. The D2D receiver device may attempt to decode one or more, or all, and/or (e.g., only) a selected subset of radio resources determined as a function of parameters, such as D2D services that may be received. For example, if there is an ongoing high priority D2D data transmission to be received by the device, it may choose to not receive on radio resources corresponding to the lower priority SA/data pool, for example, if there are receiver processing constraints. For example, if the device may be configured to receive selected (e.g., only certain selected) types of D2D signals/channels, such as low priority background service signaling, it may forego reception and/or processing of radio resources corresponding the high priority SA/data pools. The D2D receiver device may uses the determined radio resources to demodulate and/or process the D2D data transmissions.

Priority based access may utilize contention resolution of radio resources.

Priority based access for D2D communications may be realized through the use of persistence parameter(s), for example, while determining time/frequency resources for D2D transmission.

Persistence parameter(s) for use with prioritized D2D access may be associated with radio resources for scheduling assignments (SA), D2D data, control or service signaling such as D2D discovery, for example, for one or more of D2D data signals/channels or for one or more or some D2D data signals/channels. The use of persistence parameter(s) may be combined with different resource selection approaches, such as random resource selection, channel busy measurements, or resource allocation by means of D2D grants.

Figure 8:
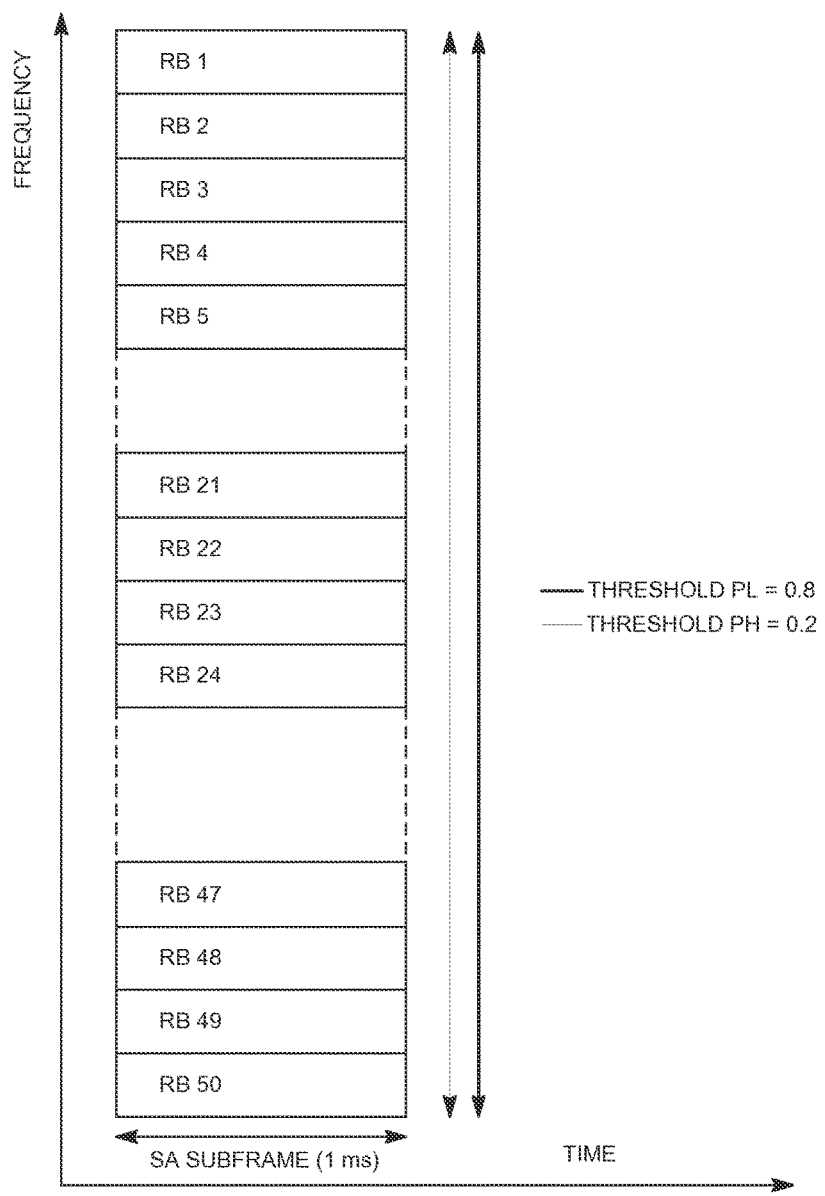
FIG. 8 is an example of priority based access for D2D data using persistence parameters (for example, SA).

FIG. 8 is an example diagram of priority based access for D2D data using persistence parameters (e.g., SA). In FIG. 8, persistence parameters may be used by a D2D transmitter device with D2D data to transmit to determine if radio resources may be used by the transmitter device, and if they may be used, determine the SA resources that may be used for priority based D2D data at the beginning of a scheduling period.

The D2D transmitter intending to transmit D2D data may determine a set of available SA resources. The D2D transmitter may determine which SA resources may be available by different means, such as from received configuration signaling, from pre-stored information, and/or from channel measurements. For SA resources deemed available, the D2D transmitter may draw a random number from 0 . . . 1 for one or more (e.g., every) SA access opportunity. The D2D transmitter may compare if the random number drawn for a given SA access opportunity is higher than a threshold value, such as for high priority data (e.g., PH=0.2). If yes, it may choose to transmit any high priority D2D data on resources corresponding to the SA in that access opportunity. If the D2D transmitter has low priority D2D data to transmit, it may (e.g., only) consider a given SA access opportunity valid, for example, if the random number drawn is higher than a threshold value (e.g., PH=0.8). If as an outcome, the D2D transmitter determines one or more valid access opportunity, it may transmit on such a selected SA access opportunity. The D2D transmitter may repeat the above for a next upcoming SA resource pool.

The D2D transmitter may (e.g., on average) determine a number (e.g., around 60%) of SA access opportunities as valid, for example, for (e.g., exclusive) transmission of any high-priority data. The D2D transmitter may determine a number (e.g., 20%) as valid for any low and/or high priority data. The D2D transmitter may deem a number (e.g., 20%) of SA access opportunities as barred.

The use of persistence parameters may statistically result in high priority D2D data being allowed to be transmitted by a D2D terminal (e.g., significantly) more often than low priority D2D data. Priority based access for D2D communications may be improved by making the higher priority data (e.g., control signaling) and/or users win resource selection of SA and/or data more often than lower priority users.

FIG. 8 may be extended to more than two priority classes with SA or data pools. For example, persistence parameters associated with N=4 priority categories may be used. Access opportunities for D2D data transmission may be construed from a set of time/frequency resources determined and/or signaled and/or limited to within different subframes and/or frequency regions. The list of available resources may be obtained from preceding measurements and/or channel observations. The examples described herein may be extended to persistence parameters associated with subframes and/or counters and/or indices representative of time rather than D2D access opportunities in frequency-domain. Time and/or frequency resources might not be contiguous.

The principles described herein may equally apply independently or in conjunction with one or multiple scheduling periods, for semi-persistent, for time-limited or for dynamically granted D2D data transmissions. While examples described herein may be used in the context of SA access opportunities, the use of persistence parameters associated with D2D access opportunities may equally be applied to D2D data subframes and/or for using different D2D channels or signaling messages. For example, priority based access for D2D discovery messages, as opposed to D2D control signaling, may be determined as described herein.

Priority based access for D2D communications may be realized through the use of persistence parameter(s), for example, while determining valid time/frequency resources for D2D transmission.

A D2D transmitter device may determine whether a D2D transmission opportunity may be allowed, for example, as a combination of a channel measurement in conjunction with persistency parameters. The channel measurement may be substituted by a (e.g., random) selection of candidate D2D transmission opportunities.

Persistence parameter(s) for use with prioritized D2D access may be advertised by a controlling device. The controlling device may be a D2D terminal. The controlling device may be an LTE radio network device, such as a base station.

A controlling device may signal a set of persistence parameters (e.g., first set of persistence parameters) associated with radio resources to be used for high priority D2D data transmissions. A controlling device may signal a set of persistence parameters (e.g., second set of persistence parameters) radio resources to be used for lower priority D2D data a missions. Persistence parameters may distinguish between different types of D2D data and/or control or service messages, and may include different parameter sets for different types of signaling.

The controlling device may (e.g., explicitly) signal those radio resource sets by using a shared control channel, such as a BCH or PD2DSCH broadcast channel. System information on BCH may contain a combination of one or both of subframe number or subframe sets, and/or frequency resources in combination or association with persistence parameters. Persistence parameters may be given (e.g., explicitly). Persistence parameters may be derived (e.g., implicitly) on the order in which they are communicated. Persistence parameters may be given as part of an index.

Persistence parameter(s) for use with prioritized D2D access may be adjusted by a D2D terminal, for example, as a function of one or more of the following: observed signal conditions, channel measurements, sensing of transmission collisions and/or interference, detection of transmissions by higher priority WTRUs, timing and/or counter values (e.g., based on data latency requirements), and/or signaling events.

A transmitting D2D terminal may determine (e.g., determine in a first instance) that no D2D access opportunity may be allowed, for example, as an outcome of the persistency check. The transmitting D2D terminal may defer an attempt for its D2D transmission to a (e.g., second) later time instant. The D2D transmitter may decrease the threshold value for low priority access to a lower value (e.g., to PL=0.7). This may be the case if, for example, a certain condition is met (e.g. based on signal conditions, timing or counter value, signaling events, etc.). If during the (e.g., second) later time instance it still fails to transmit its low priority data, it may decrease the threshold to a lower value, for example, to 0.6. If in a (e.g., third) later time instance it succeeds in transmitting low priority D2D data, the D2D terminal may reset the threshold to the initial value, for example, PL=0.8, for any (e.g., subsequent) initial attempt to transmit low-priority data.

Persistence parameters may be adjusted by a D2D transmitter, for example, as a function of one or more (e.g., one) of the following events or observations, successful or failed access attempts, available absolute or relative D2D traffic volume in queue(s), timer or counter values at expiry (e.g. for delay-sensitive traffic or to meet latency requirements) or as a function of preceding D2D data transmission or reception events, received signal strength of signals or channels received from other D2D terminals or LTE infrastructure nodes, etc. Adjustment of persistence parameters by a D2D terminal may occur separately for different types of D2D data transmission, such as a set of persistence parameters (e.g., first set of persistence parameters) subject to continuous monitoring and/or updates for D2D control signaling, a set for D2D high priority data (e.g., second set for D2D high priority data), a set of persistence parameters (e.g., third set of persistence parameters) being adjusted as a function of signal conditions, events or timer/counter conditions for D2D Discovery, etc.

The persistence parameters applicable to a type of transmission for a D2D terminal may be adapted as a function of property(ies) of received D2D signals, e.g., transmitted by other terminals. Such signals may or might not be intended for the D2D terminal adapting the persistence parameters. The properties may include one or more of the following: a propriety related to the number of D2D transmissions received over a period of time, possibly from a specific channel (e.g., PSCCH or PSSCH); or a priority level associated to at least one received D2D transmission.

A WTRU may decrease a persistence parameter applicable to a type of transmission, e.g., if it receives at least one D2D transmission (or its associated SA). The received D2D transmission may have to satisfy at least one of the following conditions: the priority level of the received D2D transmission may have to be higher than, or equal to or higher than, the priority associated to the type of transmission; the received D2D transmission may have to be received no more than a certain duration after the last received D2D transmission, possibly of the same or higher priority; a group destination ID, source or destination ID associated to the received D2D transmission may have to match certain value(s), the resource from which the D2D transmission was received (e.g., resource pool) may have to match one of a set of resources, such as a resource pool associated to the type of transmission to which the persistence parameter is applicable.

A priority level of a received D2D transmission may be obtained from one or more of the following: a field included in sidelink control information (e.g., in a PSCCH), such as an explicit indication of priority, or a Group destination ID that may be associated to a priority level; a field in a MAC header of a transport block decoded from PSSCH, such as an explicit indication of priority, or a source or destination identity associated to a priority level; a resource from which the D2D transmission was received (e.g., resource pool and/or T-RPT).

For one or more, or each, received D2D transmission the persistence parameter may be decreased by a first step size. The persistence parameter may be increased by a second step size (e.g., which may typically be smaller than the first step size) at regular intervals, such that its value e.g., gradually restored to a higher level in absence of received D2D transmission. The WTRU may periodically determine a value of the persistence parameter based on the number or density of received D2D transmission (or equivalently SAs) over a past evaluation period or equivalently based on the estimated load on the D2D resources (e.g., based on estimated average SINK, or other).

The WTRU may receive the value of the persistence parameter from a field in PSCCH or PSSCH of the received D2D transmission and may apply this value if it is lower than the current value and/or until a timer started upon reception of this transmission expires.

The persistence parameter may be constrained to be within a defined range, e.g., such that it cannot decrease below a certain value (or increase above a certain value) even if one of the above conditions is satisfied.

Supporting parameters may be configured by higher layers, pre-defined, or pre-configured. Such supporting parameters may for instance include one or more of step sizes, intervals, duration of evaluation period, persistency values (e.g., possibly for one or more, or each, value of a received field if applicable), corresponding intervals of the number of received transmission within an evaluation period, or minimum and maximum values.

Properties of received D2D signal(s) as described herein may determine the selection of a resource pool among a set of candidate resources (e.g., which may be in addition to persistence parameters). For example, the WTRU may select a resource pool that maximizes or minimizes a certain metric, where the metric may be a function of the received D2D transmissions on the resource pool. The metric may be evaluated similarly as described for the persistence value herein (e.g., decrease when the number of received D2D transmissions in a period of time is higher).

Persistence parameters applicable to a type of transmission for a D2D terminal may be adjusted as a function of properties of received D2D signal(s) transmitted by one or more other terminals. Such signals may or might not be intended for the D2D terminal adapting the persistence parameters. A Property of a received D2D signal may include one or more of; a property related to the number of D2D transmissions received over a period of time, for example possibly from a specific channel (e.g., PSCCH or PSSCH); or a priority level associated with at least one received D2D transmission.

One or more persistence parameters may be adjusted based on a received D2D transmission. For example, a WTRU may decrease a persistence parameter applicable to a type of transmission if it receives at least one D2D transmission. The received D2D transmission may satisfy at least one of the following conditions: the priority level of the received D2D transmission is higher than, or equal to or higher than, the priority associated to the type of transmission; the received D2D transmission is received no more than a certain duration after the last received D2D transmission (e.g., of the same or higher priority); a group destination ID or source or destination ID associated with the received D2D transmission matches a certain value(s); the resource from which the D2D transmission was received (e.g., resource pool) matches one of a set of resources, such as a resource pool associated with the type of transmission to which the persistence parameter is applicable.

A priority level of a received D2D transmission may be obtained from one or more of the following: a field included in sidelink control information (e.g. in a PSCCH), such as an explicit indication of priority, or a Group destination ID that may be associated with a priority level; a field in a MAC header of a transport block decoded from the PSSCH, such as an explicit indication of priority, or a source or destination identity associated with a priority level; a resource from which the D2D transmission was received (e.g., resource pool and/or T-RPT).

One or more persistence parameters may be adjusted based on a received D2D transmission. One or more of the following examples may apply.

When a D2D transmission is received, the persistence parameter may be decreased by a first step size (e.g., this may occur one or more, or each, time a D2D transmission is received). The persistence parameter may be increased by a second step size (e.g., which may typically be smaller than the first step size) at regular intervals, such that its value may gradually be restored to a higher level in the absence of received D2D transmission(s).

The WTRU may periodically determine a value of the persistence parameter based on the number of received D2D transmission(s) over a past evaluation period.

The WTRU may receive the value of the persistence parameter from a field in PSCCH or PSSCH of a received D2D transmission and may apply this value if it is lower than the current persistence parameter value. The value may be maintained until a tinier started upon reception of the transmission expires.

The persistence parameter may be constrained to be within a defined range. For example, the persistence parameter cannot decrease below a certain value (or increase above a certain value) even if one of the above conditions is satisfied.

Supporting parameters may be configured by higher layers, pre-defined, or pre-configured. Supporting parameters may for instance include at least one of a step size, interval, duration of evaluation period, persistency value (e.g., for one or more, or each, value of a received field if applicable), corresponding interval of the number of received transmission within an evaluation period, or minimum and maximum values.

Properties of received D2D signals as described herein may determine the selection of a resource pool among a set of candidate resources (e.g., this may be in addition to the persistence parameters). For example, a WTRU may select a resource pool that maximizes (or minimizes) a certain metric, where the metric may be a function of received D2D transmission(s) on the resource pool. The metric may be adjusted as for the persistence value as described herein (e.g. decrease when the number of received D2D transmissions in a period of time is higher).

Priority based access may include persistent radio resources.

Priority based access for D2D communications may be realized through persistent radio resource allocation to high priority D2D channels or signals or users.

Persistent radio resource allocation may mean the use of radio resource transmission opportunities that may be kept by the D2D terminal for the duration of a high priority D2D transmission and/or for a pre-determined and/or for a pre-configured duration, such as in excess of a single scheduling period. A persistent radio resource allocation may be characterized by that a D2D terminal may keep the acquired radio resources for a prolonged period of time, for example, without re-selecting a D2D transmission opportunity, such as when it determines access to D2D radio resources through a channel selection mechanism to start its high priority D2D channel and/or signal transmission. Channel selection mechanism may, for example, mean random selection of a radio resource, such as a subframe and RB combination. Channel selection mechanism may mean measurement based radio resource selection, such as a set of least interfered RB's in a subframe. Channel selection may mean resource allocation through another device, such as an eNB.

A D2D terminal intending to transmit a high priority D2D voice group channel may determine allowed D2D subframes, for example, from pre-stored information in the device. The pre-stored information may include a set of subframes (e.g., first set of subframes) allowed for transmission of SA and/or a subframe (e.g., second subframe) set allowed for use with D2D data over a given transmission period. The D2D terminal may perform channel selection through measurements on SA subframes to determine a suitable, least interfered, transmission opportunity for its SA. The device may select one or more (e.g., two) PRBs in an SA subframe for transmission of its own SA. Channel selection through measurements to determine least interfered resources may imply deferral of transmission to a later time instant, such as when the D2D terminal might not identify a suitable (e.g., not interfered) transmission opportunity. The D2D terminal may transmit D2D data associated with this SA over the corresponding scheduling period, for example, once the D2D terminal starts transmitting the SA. The location of corresponding D2D data in subframes and RBs included within the subframes part of the scheduling period may be indicated through a radio resource transmission pattern (RRTP). The RRTP may be included in the SA, for example, as part of its payload, or it may be given through the time/frequency location of the SA, or a combination thereof. The D2D terminal may be allowed to keep the radio resources it acquired (e.g., as opposed to relinquish these resources) to re-perform channel selection on SA and/or the corresponding D2D data resources, for example, once the scheduling period is over. The D2D terminal may avoid the channel selection and/or any ongoing high-priority D2D transmission might not be interrupted. Priority based access may be improved (e.g., statistically) such that high-priority D2D channels might not contend for access to resources. High-priority D2D channels may contend for resources at the beginning of a transmission. Long (e.g., sufficiently long) high-priority D2D transmissions, such as in the order of more than several scheduling periods, may utilize guaranteed access to D2D radio resources, for example, once acquired. High-priority D2D data transmissions may improve, for example, in that they might not suffer from interruption during an ongoing transmission due to channel selection.

A D2D terminal that selected a D2D transmission opportunity in a time period (e.g., first lime period) may keep the acquired radio resources in a time period (e.g., second time period), for example, if it may have high priority D2D data to transmit.

For example, a D2D terminal may have selected to transmit the SA in RBs 3-4 of subframe 1 in SFN 1. Transmitting associated D2D data in selected subframes from SFN 1-16 may keep using that same or similar SA transmission opportunity, such as in RB's 3-4 of SFN 17 for the next scheduling period.

The examples described herein may be extended to ft the purposes of particular D2D data characteristics. For example, the RRPT of a transmission period (e.g., first transmission period) may determine the RRPT of a subsequent transmission period. The persistent use of D2D transmission opportunities may be indicated by the D2D terminal, for example, as part of its D2D data and/or control signaling. Such an indication may be realized through part of a payload, such as given by an SA information field, or through the choice of sequence encoding parameters or initialization values or settings, or through of a particular signaling format in one or more or all of the transmission periods.

A D2D terminal that may have selected a D2D transmission opportunity at time instant T1 may keep selected D2D radio resources for a pre-determined amount of time before re-selecting a D2D transmission opportunity.

For example, a D2D terminal having selected to transmit the SA in RBs 3-4 of subframe 1 in SFN 1 may keep the radio resources for duration 3.2 sec.

D2D service access classes may be described herein.

D2D terminals may store as part of their D2D related configuration the D2D service access class information related to D2D data types they may support.

D2D access class information may correspond to any type of parameter used to support priority based access for D2D data transmissions. A D2D access class for a given terminal may correspond to those D2D and/or public-safety services it may support.

A D2D terminal may (e.g., may only) support file upload and/or download. A D2D terminal might not support public safety voice call groups, such as it might not support audio applications. The D2D terminal may (e.g., may only) support an exemplary D2D service access class three and use (e.g., only use) any advertised low-priority D2D access opportunities.

A D2D terminal may support public safety voice groups and/or file upload or download. The D2D terminal may support an exemplary D2D service access class two and/or three and/or may use high priority and/or low priority D2D data access opportunities.

A D2D terminal may support voice (e.g., only voice) and may be reserved for use by personal in the line of command or for voice call groups. The D2D terminal may support a (e.g., exemplary) D2D service access class one for highest, emergency-type, voice calls, and/or class two for high priority D2D data access opportunities.

D2D service access classes may be associated with stored configuration information that may establish different types of allowed D2D services in D2D terminals.

D2D service access classes stored in a D2D terminal may be used in conjunction with channel access parameters obtained from signaling to determine allowed D2D time/frequency radio resources by that D2D terminal. For example, a D2D terminal supporting high priority and low priority D2D data transmissions according to its stored D2D service access class 2 and 3 may read D2D related configuration information from a DL broadcast channel, it may configure its transmitter as a function of decoded signaling parameters (e.g., as described herein) for these classes, and it may discard and/or disregard any information obtained according to advertised D2D service class 1 of highest priority which it might not support.

D2D service access classes in a D2D terminal may be associated with a set of stored channel access parameters for D2D prioritized access.

For example, a set of allowed D2D subframes (e.g., first set of allowed D2D subframes) for SA transmissions in time may be associated with a D2D service access class, for example, in the form of a database or index table entry. A set of persistence parameters (e.g., first set of persistence parameters) may be stored in a D2D terminal associated with a D2D service class (e.g., first D2D service class), such as public safety voice. A set of persistence parameters (e.g., second set of persistence parameters) associated D2D service class (e.g., second D2D service class), such as file upload or download, may be stored in a D2D terminal.

D2D transmission and/or reception may be disclosed. D2D transmission and/or reception may include priority handling.

A WTRU may transmit an indication that access to at least one resource is desired for transmission of certain voice or data traffic. Such indication may be referred to as desired access indication as described herein. Such indication may be provided via the use of a pre-emption indication as described herein. A WTRU receiving such an indication may interrupt on-going transmissions and/or refrain from accessing a resource for a period of time. The received indication may be provided to higher layers (e.g., an application layer). This may indicate to the end-user that another user desires access to a resource.

One or more triggers for transmission of a desired access indication may be provided. A WTRU may initiate transmission of the desired access indication based on one or more of the following.

An application may request a triggering transmission of the desired access indication. Such request may originate from an end-user, e.g., through a user interface. For example, one or more of the following may apply. An end-user may press a specific key or button of the equipment used for voice or data transmission, for instance in an emergency situation. The transmission of the Desired Access Indication may be triggered by a speech emotion recognition application detecting an emotion consistent with an emergency situation. Transmission of the desired access indication may be triggered if the WTRU determines that one or more available resources (e.g., all available resources) are utilized for transmission from other WTRUs. The indication may be triggered if (e.g., only if) the detected transmissions from other WTRUs are at a lower priority level.

Transmission of the desired access indication may be triggered if (e.g., only if) the WTRU determines that no other WTRU may have transmitted a desired access indication that may still be valid. If a priority level is indicated as part of the desired access indication, such condition may apply if (e.g., only if) the indication that may be transmitted by another WTRU indicates priority (e.g., higher or equal priority) than the indication to be triggered. Possible conditions to determine if a received indication is valid may be described herein.

A desired access indication may include one or more of the following. The WTRU may include one or more (e.g., at least one) of the following as part of the message containing the Indication. An identity of the WTRU. A value identifying traffic that may be concerned by one or more Indications ("Traffic identity"). For the transmitted indication (e.g., first transmitted Indication) related to a given traffic, such value may be selected (e.g., randomly selected) from the subset of possible values that might not be used by other Indications. For Indications (e.g., subsequent Indications), the value may be set to the same or similar value as in other Indications (e.g., previous Indications) related to the same or similar concerned traffic. One or more (e.g., at least one) property of the traffic concerned by the indication, such as: a priority level; a duration; an expected duration; an amount of data; a data rate; a transmission power level; an application; a service. One or more (e.g., at least one) identifier of a resource for which the Indication may apply. The WTRU may set the one or more (e.g., at least one) identifier to identify resource(s) concerned by the indication. A period of time (e.g., or delay) before the concerned traffic may start to be transmitted, and/or before the Indication may be retransmitted. This value may correspond to the duration of a Wait timer. An indication whether, for example at expiry of the delay, the concerned traffic may start to be transmitted or the Indication may be retransmitted.

Transmission of desired access indication may be described herein. The desired access indication may be encoded and/or transmitted over a physical channel used for control purposes, such as the PD2DSCH. The indication may be transmitted using the same or similar type of transport or physical channel as normal traffic, for example, possibly using a specific resource or one or more of a set of reserved resources for the indication. The indication may be included as part of a Scheduling Assignment and/or may be transmitted within a set of resources used for the transmission of Scheduling Assignment. The indication may be transmitted in multiple instances for added robustness.

Actions may be taken upon transmission of a desired access indication. Upon transmission of the indication and/or after completing transmission(s) of the Indication, the WTRU may start a timer (e.g., referred to herein as the "Wait Timer") whose duration may correspond to the (e.g., latest) time at which the WTRU may initiate transmission of the concerned traffic and/or may retransmit the indication. The WTRU may monitor one or more (e.g., at least one) valid resource to detect whether it is available and/or if one or more (e.g., at least one) other WTRUs may be transmitting on the resource. A valid resource may correspond to one or more (e.g., one) of a set of resources configured to be available for transmission of traffic that may be concerned by a desired access indication. The WTRU may (e.g., may only) consider a resource valid if it may be associated with a priority level equal to or lower than the priority level of the concerned traffic.

The WTRU may stop the Wait timer, for example, upon detecting that one or more (e.g., at least one) resource may be available for transmission of the concerned traffic. The WTRU may initiate transmission of the concerned traffic on the one or more (e.g., at east one) resource.

Upon expiry of the Wait timer, the WTRU may perform one or more (e.g., at least one) of the following actions. The WTRU may re-initiate transmission of the Indication and/or restart the Wait Timer. The WTRU may initiate transmission of the concerned traffic on a valid resource, if the WTRU detected or did not detect transmissions from other WTRUs on this resource. Upon initiation of transmission of the concerned traffic, the WTRU may start a timer (referred to herein as the "Keep-alive" timer).

Upon selection of a resource for transmitting the concerned traffic, the WTRU may initiate transmission of a Selected Resource Indication, for example, for the purpose of indicating to other WTRUs which resource(s) has been selected. This may allow other WTRUs to resume transmissions on resources not used by the WTRU. The Selected Resource Indication may contain one or more (e.g., at least one) resource identifier (e.g., index) and/or a duration or minimum duration for the use of the resource(s). The Selected Resource Indication may be identical or similar to a Desired Resource Indication, for example, with signaled value(s) for the resource identifier that may be different from a transmitted (e.g., previously transmitted) Desired Resource Indication.

The WTRU may initiate transmission of a subsequent Desired Access Indication and/or of a Selected Resource Indication, for example, upon expiry of the Keep-alive timer, if it determines that there may still be traffic concerned by a Desired Access indication that may be transmitted. The Keep-alive timer may correspond to the same or similar value as the Wait timer or be identical or similar to the Wait timer.

The Release indication may be transmitted. Release indication transmission may be disclosed herein. The WTRU may trigger transmission of a Release Indication and/or stop a Keep-alive timer, for example, when there may be no more traffic concerned by a transmitted (e.g., previously transmitted) Desired Access Indication that may be transmitted. Such determination may be performed using mechanisms similar to mechanisms described herein that may be used for triggering the Desired Access Indication based on higher layers. A maximum duration for transmitting traffic concerned by a Desired Access Indication may be configured by higher layers or otherwise. The Release indication may include a Traffic identity corresponding to the concerned traffic. The Release Indication may be encoded and/or transmitted over the same physical channel as the Desired Access Indication.

Actions may be taken upon reception of Desired Access Indication and/or Selected Resource indication. A WTRU may monitor one or more (e.g., at least one) physical channel on which other WTRUs may transmit Desired Access Indications, Selected Resource Indications and/or Release Indications.

Upon reception of a Desired Access Indication, a WTRU may perform one or more (e.g., at least one) of the following actions. The WTRU may take the indication into account (e.g., only) for traffic that may have priority lower than or equal to the priority level signaled by the received indication. This may be referred to herein as "de-prioritized traffic". The WTRU may stop a running Wait timer and/or Keep-alive timer associated to a received (e.g., previously received) indication, for example, including the same or similar Traffic identity parameter. The WTRU may start or may restart a Wait timer with a duration whose value may be included in the received Indication.

Upon reception of a Selected Resource Indication, a WTRU may stop a running Wait timer and/or Keep-alive timer associated to a received indication (e.g., previously received indication), for example, including the same or similar Traffic identity parameter, and may start or may restart a Keep-alive timer with a duration whose value may be included in the received Indication. The Indication may be sent to higher layers, such as an application layer or a user interface, for example, to notify the end user that another user may be attempting to access resources. Such notification may be visual (e.g. light indicator), audible, or tactile (e.g. vibration).

The WTRU may determine whether it is transmitting (e.g., currently transmitting) de-prioritized traffic on one or more (e.g., at least one) resource concerned by the Indication. The set of resources concerned by the Indication may correspond to the one or more (e.g., at least one) value included in the indication, if present. The set of resources may correspond to resources associated with priority levels that may be equal to, or lower than, the priority level included in the Indication. The WTRU may stop (e.g., immediately stop) transmission of de-prioritized traffic on such resource. The WTRU may stop transmission, for example, at the beginning of the next scheduling period, and/or at expiry of the Wait timer. Interruption of traffic transmission on a resource may take place if (e.g., only if) another resource may be available or if the Indication might not be sent to an application layer or user interface.

While a Wait timer or Keep-alive tinier associated to a received (e.g., previously received) indication may be running or upon reception of a Selected Resource Indication, a WTRU may select one or more (e.g., at least one) resource that might not be part of the set of resources concerned by the Indication for transmitting de-prioritized traffic and/or for initiating transmission of de-prioritized traffic.

Actions may be taken upon reception of Release indication and/or upon expiry of Keep-alive timer. Upon reception of a Release indication, the WTRU may stop any timer (e.g., Wait timer or Keep-alive timer) associated to a received (e.g., previously received) Indication, for example, including the same or similar Traffic identity parameter. The WTRU may determine that no traffic may be de-prioritized, for example, with respect to the Traffic identity that may be included in the Release Indication. Upon expiry of a Keep-alive timer, the WTRU may determine that no traffic may be de-prioritized, for example, with respect to the Traffic identity that may be included in the associated Release Indication (e.g., upon reception of which the timer may have been started).

Pre-emption may utilize D2D prioritized channel access.

Pre-emption Indication may be explicit. Explicit pre-emption indications and physical processing of a pre-emption indication may be described herein. In a distributed scheduling D2D system, there may be no controlling entity to ensure that high-priority messages get access to the resources on time. Pre-emption may be a mechanism that may be used by a device to interrupt (e.g., temporarily interrupt) an on-going communication from another device, for example, so that the resource may be freed for its own use.

Pre-emption may be motivated, for example, where the resource may be constrained, such as when a WTRU may transmit a high-priority message and/or one or more, or each, resource may be utilized (e.g., currently utilized). Pre-emption may be used when resources for a group of users (e.g., or other classification) may be occupied and/or a higher priority signal for that group may be transmitted (e.g., there are other radio resources available and they may be reserved for other user groups).

A D2D WTRU may be configured to transmit a pre-emption indication. The indication may consist of a message and/or may carry an amount of information. The indication may consist of a signal, for example, from which an amount (e.g., limited amount) of information may be inferred.

Message-based indication may be described herein. The D2D WTRU may be configured to transmit a message-based pre-emption indication. The pre-emption message may carry one or more of the following information, in any order or combination: a resource index, an identity, a priority level, an amount of time to backoff an interruption cause, and/or T-RPT. The pre-empting WTRU may indicate a specific resource index, for example that may be chosen from a list of resources used (e.g., currently being used). The transmission associated to that resource may be interrupted, regardless of the identity of the user transmitting (e.g., currently transmitting) over the resource. The identity may be used to indicate a target WTRU identity and/or group identity to pre-empt (e.g., which user/target group may stop transmission). The priority level may be associated to the pre-emption message and/or of the data transmission. The WTRU may indicate the priority level associated to its transmission, for example so that WTRUs with lower priority may stop transmission. The amount of time a pre-empted WTRU may interrupt its transmission. After the backoff time has expired, the pre-empted WTRU may be allowed to resume transmission. The interruption cause may be the cause of the pre-emption. For example, the cause may be chosen from a finite list, including for example, an emergency relaying, etc. The T-RPT may be the pattern index to pre-empt. The WTRU may indicate (e.g., explicitly) the resources it may want to interrupt.

The WTRU may be configured to transmit the pre-emption message via a scheduling assignment (SA). The WTRU may be configured to use a special identifier in the SA to indicate that the SA may be associated to a pre-emption message. The WTRU may send the pre-emption message via SA as a control signal, for example.

The pre-emption message may be carried in the SA directly, thereby replacing the existing fields of the SA. The WTRU may use a reserve SA pool to transmit pre-emption message using SA format. The D2D WTRUs transmitting data may be configured to monitor the pre-emption resource pool to determine whether or not their transmission may be pre-empted. The WTRU receiving the pre-emption message may be configured to determine (e.g., blindly determine) if a received SA may be a conventional SA or a pre-emption message. The WTRU may make this determination, for example, based (e.g., blindly based) on the CRC appended to the SA and/or pre-emption message. The pre-emption message part may be carried in the data associated to the SA. For example, the pre-emption message may be carried via a MAC control element (CE).

The WTRU may be configured to transmit the pre-emption message over a PUCCH resource.

This PUCCH resource may be associated to a D2D transmission. The association may be done, for example, based on the characteristics of the SA associated to the transmission that the WTRU may want to interrupt. For example, the WTRU may be configured to transmit the pre-emption indication at a known instant of time, for example, after the SA was transmitted, and/or at a specific PUCCH location in frequency, for example, based on the SA resource that may be used.

The WTRU may use a signal format to transmit the pre-emption Message. The WTRU may be configured to transmit the pre-emption message in a time/frequency resource that may be reserved for pre-emption.

The WTRU may be configured to transmit and/or receive a pre-emption message in (e.g., only in) a set of designated time/frequency resources.

The set of designated time/frequency resources for transmission and/or reception of the pre-emption message may be obtained from one or more of the following: timing values such as frame or subframe counters; cell-wide or D2D system frame values; timing offset value(s) applied to a reference subframe or frame; offset applied to occurrence(s) of a selected cell-wide or D2D signal or channel; frequency indices, RBs, or group of frequency regions; cell-wide or D2D system or WTRU identifier; group communication identifier; or channel or group index value(s).

Some or all parameters may be pre-configured in the WTRU, or they may be obtained through configuration signaling during system operation, or they may be derived by the WTRU by means of a lookup table or formula or equivalent.

The WTRU may transmit or receive a pre-emption message in a set of selected and/or reserved subframes that may comprise a subset of possible SA subframes. For example, when SA is configured for a scheduling period of 80 ms, then every 4th occurrence of the SA subframes for a particular Scheduling Period may include pre-emption messages. In this case of shared resources where both SA and pre-emption messages may be present, the WTRU may distinguish through decoding whether a particular time/frequency resource includes an SA or a pre-emption message.

The WTRU may be configured with a set of D2D subframes not used for SA or D2D data which it may use to transmit and/or receive a pre-emption message. For example when SA is configured for a scheduling period of 40 ms, a pre-emption message may be transmitted or received in a designated D2D subframe reserved for that purpose every 80 ms and which, for example, otherwise might not be used for SA or data transmissions. For this case where dedicated time/frequency resources are used for pre-emption messages, the WTRU may detect a single transmission format (e.g., only need to detect a single transmission format).

The WTRU may transmit and/or receive a pre-emption message in a subset of D2D data subframes. While SA announces D2D data for a scheduling period, a set of D2D data subframes may include control signaling carrying a pre-emption message. The WTRU may determine presence and/or absence of a pre-emption message on a set of D2D subframes by means of decoding the selected signaling format.

The WTRU may transmit or receive a pre-emption message in one or more limited frequency regions, which may be selected from a set of possible D2D subframes in use for control or data. The WTRU may decode for presence of a pre-emption message or transmit a pre-emption message on (e.g., only on) a selected set of RB's (e.g., 1-10) in a subframe configured for SA. Allowed sets of RBs may be known to the WTRU and/or derived from RB indices.

Signal-based indication may be described herein.

The WTRU may be configured to send a signal, for example, as a means for pre-emption indication. This signal may consist of a signal taken from a pre-defined list of sequences, for example, based on Zadoff-Chu sequences.

While the pre-emption signal itself might not carry any information (e.g., explicit information). Indications (e.g., implicit indications) may be inferred by the receiving WTRU from reception of the signal.

A receiving WTRU may determine information from the pre-emption signal, for example, based on the index of the signal, the time/frequency transmission and/or others. The pre-emption signal may be transmitted on a set of PRBs that may be associated using a known set of rules to an ongoing transmission to pre-empt. The WTRU may be configured to transmit the pre-emption signal on a set of PRBs associated to the SA associated to the transmission that it may want to pre-empt.

The WTRU may be configured to select the pre-emption signal (e.g., or the parameters for generation of the sequence) from a pre-defined list, for example, based on one or more of the following: priority level of transmission; WTRU Identifier (e.g., RNTI, IMSI, or other); group communication identifier; transmission pattern index, that may be the transmission pattern associated to the transmission the WTRU desires to pre-empt The WTRU may base the selection of the pre-emption signal on one or more of the elements described herein.

When to transmit a pre-emption indication may be determined. The WTRU may be configured to determine conditions when to transmit a pre-emption indication. The WTRU may be configured to determine to transmit a pre-emption indication, for example, based on one or more of the following triggers (in any order or combination). The WTRU may have data to transmit. The WTRU may be configured and/or allowed to use pre-emption. The data to transmit may be associated to a logical channel/bearer/QoS/QCI for which pre-emption may be allowed and/or configured. The WTRU may receive commands to start/stop pre-emption from the higher layers (for example, RRC). The data packet to be transmitted may be associated with a request for pre-emption sent by higher layers (for example, MAC). The WTRU may have determined, for example, based on measurements or monitoring of the SAs, that there may be no radio resources available for transmission of its data. The WTRU may have determined that there is one or more (e.g., at least one) resource that may be (e.g., currently) used and/or that may be pre-empted. The WTRU may be configured to determine the priority level of one or more, or each, data transmission, for example, based on the SA it may receive. The WTRU may be configured to determine for one or more, or each, received SA and/or for one or more, or each, transmission received whether or not it may be pre-empted. This may be carried out, for example, based on one or more of the absolute priorities, the identity of the transmission sources, the target identity for transmission, etc. For example, the priority of the data to transmit may be higher than one or more (e.g., at least one) on-going transmission. The priority of the WTRU may be higher than the priority of one or more (e.g., at least one) other WTRU transmitting data. The priority of the target group may be higher than the priority of one or more (e.g., at least one) other target group for which data may be being transmitted to.

A WTRU may take actions upon reception of a pre-emption indication. A D2D WTRU transmitting data may be configured to monitor for potential pre-emption indications. The WTRU may be configured to receive the pre-emption indication in a reserved known time/frequency location and/or may be configured to receive the pre-emption in an SA.

The WTRU may determine whether or not to act on the received pre-emption signal.

When a WTRU may determine that it has received a pre-eruption indication, the WTRU may be configured to determine if it may act and/or may wish to act on the pre-emption indication. The WTRU may be configured to determine whether or not it may act and/or may wish to act on the received pre-emption indication, for example, based on one or more of the following. The priority level that may be associated to the pre-emption indication (e.g. explicit pre-emption priority level, priority level associated to the transmitter of the pre-emption indication, priority level of the target group, etc.). The target WTRU that may be associated to the pre-emption indication. For example, the pre-emption indication may carry information to indicate a target transmitter/transmission to interrupt. The WTRU may be configured to determine if it is the target of the pre-emption indication, for example, based on the content of the pre-emption message (e.g. transmitter identifier, group identifier, specific resource identifier, priority level, etc.), or (e.g., implicitly) based on the time/frequency/signal characteristics of the pre-emption signal.

Pre-emption application may be described herein.

The WTRU may act on the pre-emption indication received by the WTRU and may be configured to release the resource that may be pre-empted. The WTRU may be configured to perform the following, for example, upon detection of a pre-emption indication for which it may determine that it may act upon and/or may wish to act upon. The WTRU may stop data transmission. The WTRU may release the resource. The WTRU may be configured to slop transmission of the SA. The WTRU may be configured to transmit an indication of a resource release. For example, the WTRU may be configured to transmit a special indication in an SA to indicate termination, indicating (e.g., optionally indicating) the cause of the transmission termination (e.g., pre-emption). The WTRU may be configured to start a backoff timer (e.g., of a pre-defined value). The WTRU might not be allowed to resume data transmission and/or attempt transmission of data, for example, until the timer expires. Once the pre-emption may be completed and/or a pre-emption timer has expired, the WTRU may be configured to re-initialize transmission as if it was a new (e.g. fresh or updated) transmission (e.g., re-evaluating the transmission parameters).

The WTRU may be configured to "keep" the resource for the duration of the pre-emption interruption. The WTRU may be configured to transmit an indication to keep the resource. For example, the WTRU may be configured to transmit an indication in an SA to indicate resource reservation (e.g. "channel hold"), indicating (e.g., optionally indicating) the cause of the resource reservation (e.g., pre-emption). The WTRU may be configured to start a backoff timer (e.g., of a pre-defined value). The WTRU might not be allowed to resume data transmission and/or attempt transmission of data until the timer expires. Once the pre-emption procedure is completed and/or a pre-emption timer has expired, the WTRU may be configured to resume transmission using the same resource that was pre-empted. The WTRU may be configured (e.g., optionally be configured) to resume (e.g., only resume) transmission using the same or similar resource, for example, if it resumes transmission within the same or similar scheduling period. The WTRU may be configured to indicate to the higher layers reception of a pre-emption indication that it may act upon and/or may wish to act upon. For example, the WTRU may be configured to indicate to the higher layers when the channel may be busy and/or the WTRU may be holding transmission. The WTRU may be configured to indicate to the higher layers when it may fail to transmit data due to pre-emption. This may be relevant for delay-sensitive applications for which the data may be discarded after some time has elapsed. The WTRU may indicate to higher layers when the duration of the interruption due to pre-emption may be longer than a specific pre-defined duration.

D2D terminals may be utilized to implement prioritized channel access.

Transmit and/or receive half-duplex may be utilized priority based access. D2D terminals may process multiple D2D channels/signals to be transmitted and/or to be received based on priority of the D2D channel and/or signals.

A receiving D2D terminal may have multiple concurrent D2D channels and/or signals to receive and/or to transmit. Based on the priority for these D2D channels or signals, it may adjust it reception and/or transmission schedule to allow for prioritized reception (e.g., or transmission) of a high priority D2D channel/signal.

Figure 9:
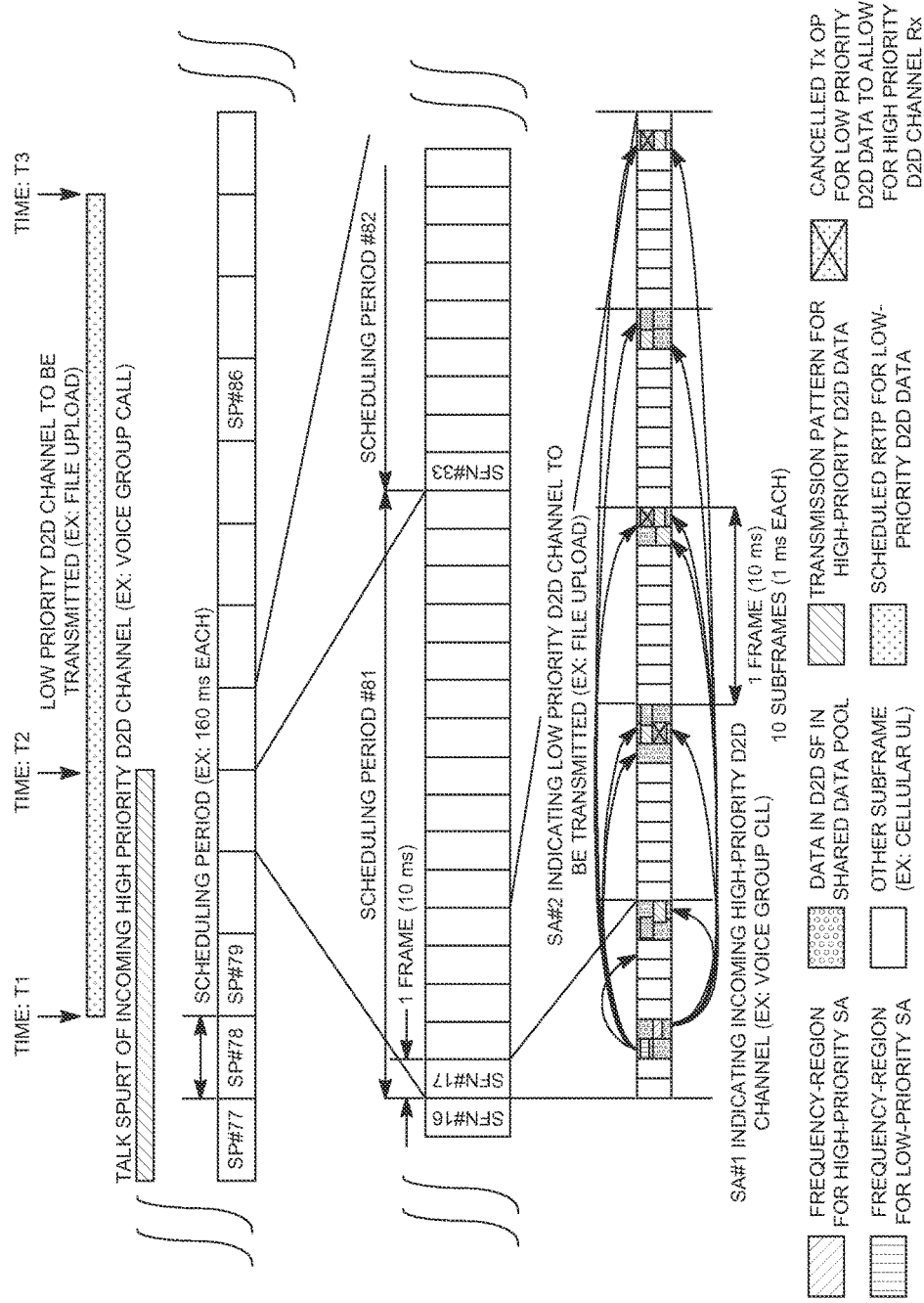
FIG. 9 is an example of prioritized reception of a high-priority channel by D2D terminal with FDD half-duplex operation.

FIG. 9 is an example diagram of prioritized reception of a high-priority channel by D2D terminal with MD half-duplex operation. In FIG. 9, a D2D terminal (e.g., concurrently) may have a high priority D2D voice channel (e.g., first high priority D2D voice channel) to receive, such as for a voice group call, while it may have a lower priority D2D data channel (e.g., second lower priority D2D data channel), such as for file upload to transmit.

In FIG. 9, a talk spurt corresponding to the incoming high priority D2D voice channel may be received over multiple scheduling periods, for example, until time instant T2. A device internal request to transmit a low priority D2D data channel (e.g., second low priority D2D data channel) may be received, for example, beginning from time instant T1. The request may be issued by the user or by an application that may process data packets for D2D and may emit such a request. The D2D terminal may have a Tx/Rx front-end operating under half-duplex constraints for D2D channels and/or signals on the cellular frequency, for example in any subframe it may transmit a D2D channel and/or signal, or it may receive a D2D channel and/or signal. The D2D terminal may be able to receive multiple D2D channels and/or signals (e.g., simultaneously) in the same or similar subframes.

Upon arrival of the transmission request for the low priority D2D data channel (e.g., second low priority D2D data channel) at time instant T1, the D2D terminal may adjust its transmission schedule to allow for full reception of one or more or all subframes corresponding to the high priority D2D channel. The D2D terminal may choose to not use certain subframes originally scheduled for transmission of the low priority D2D channel and use the indicated subframes for reception of the high priority D2D data channel, for example, if a collision occurs. At time instant T2, when the talk spurt of the incoming high priority D2D voice channel ends, and the D2D data channel (e.g., only the low priority D2D data channel) may be transmitted, the D2D terminal may adjust its transmission pattern to allow for full transmission of the low priority D2D data channel (e.g., second low priority D2D data channel). While prioritizing reception of the high priority D2D channel during time period T1-T2, the D2D terminal may choose to indicate a radio resource transmission pattern (RRPT) that may be chosen as a function of the D2D subframes that may be determined available for transmission, for example, after taking those for reception into account. The D2D terminal may choose to indicate an RRPT that may include D2D subframes for its own transmission and/or where it may receive high-priority D2D data. The D2D terminal might not transmit in these.

A D2D terminal may process (e.g., automatically process) one or more, or multiple D2D channels and/or signals to be transmitted and/or to be received based on priority handling associated with such multiple D2D channel and/or signals. No user intervention, such as manual channel switching or deferral of transmission, may be utilized. Signal reception for high-priority D2D channels may be received by dedicating reception capabilities (e.g., full reception capabilities) to D2D subframes carrying that high priority D2D channel and/or signal.

In some techniques described herein, the SA resources for high priority transmissions by one or more, or a given, WTRU may be configured to occur earlier in time than, the SA resources for low priority transmissions, perhaps for the same SA period, for example. This can be configured by the eNB, for example, by assigning them to different SA resource pools. The WTRU with low priority transmissions may decode the high priority SA resources to determine whether higher priority data may be received (e.g., first). Perhaps for example, based on this determination, among other scenarios, the WTRU may decide to not transmit on the configured low-priority SA resources, or the WTRU may transmit on the configured low-priority SA resources. The WTRU may indicate an RRPT which may allow it to receive the high priority transmission while transmitting (e.g., perhaps for example despite the half-duplex arrangement in some embodiments).

The examples described herein may be extended to more than two priority classes. Different lengths of scheduling periods may be used. SA transmissions may correspond to D2D data transmitted in a later and/or in multiple scheduling periods. Independently or in conjunction with scheduling periods, principles of semi-persistent, time-limited or dynamically granted D2D data transmissions may be used. Time and/or frequency resources might not be contiguous. While the examples used scheduling assignments and/or high and low priority received D2D voice and data channels for illustration purposes, the principle of allocating transmission and reception subframes corresponding to a low or to high priority D2D channels or signals may equally be applied to different D2D channel and/or signal messages types. For example, D2D discovery messages may be skipped for transmission and/or deferred to later for processing, while a high priority D2D control or data signaling may be received. The principle of Rx prioritization may be applied to the opposite case where D2D subframes may be prioritized for transmission, such as a high priority D2D channel signal may be transmitted by the D2D terminal, while a low priority D2D channel and/or signal may be received.

Received (e.g., concurrently received) D2D data may be voice, control, service and/or data packets, such as for IP packets corresponding to a file download. Tx/Rx processing and/or prioritization of multiple channels and/or signals to be received or to be transmitted may equally be applied to channels and/or signals received or transmitted on the cellular communications and the D2D radio links.

A D2D terminal while receiving or transmitting a D2D channel and/or signal (e.g., first D2D channel and/or signal) may determine whether a D2D channel and/or signal (e.g., second D2D channel and/or signal) may be transmitted or received. Upon determination that a D2D channel and/or signal (e.g., second D2D channel and/or signal) may be present, the D2D terminals may determine which of the D2D channels or signals that may be transmitted or received has higher priority. The determination may be based on priorities associated with D2D channels or signals or communication types. The WTRU may determine the priority of the received channel and/or signal based on a priority of the pool or channel, time/frequency, etc., in which the data and/or SA was received; this may be based on an explicit indication in the SA, based on a MAC header indication, or based on any of the features described herein.

A D2D terminal may determine a transmission and/or reception schedule to allow for a suitable number of D2D subframes to be used for transmission or reception of the high priority D2D channel and/or signal. A D2D terminal may determine suitable D2D subframes based on a variety of criteria, such as one or more of: a minimum and/or identified set of SA resources in order to be able to receive or transmit SAs, a required number and/or set of D2D subframes corresponding to possible D2D Data reception or transmission, a number of set of subframes not available for the purpose of D2D transmission and/or reception due to ongoing cellular communication, and/or a number and/or set of D2D subframes corresponding to transmission and/or reception from/to one or more WTRUs and/or D2D communication group(s).

The D2D terminal may determine to skip transmission or reception opportunities originally planned for the low priority D2D channel and/or signal. The D2D terminal may select available transmission/reception opportunities for transmission and/or reception of the lower priority D2D channel and/or signal by determining which transmission/reception opportunities may be used for the high priority D2D channel and/or signal. The WTRU may continue with the transmission or reception of the lower priority D2D channel or D2D signal, but may skip the transmission or reception in the subframes overlapping pith the subframes in which reception or transmission of the higher priority D2D channel or D2D signal is taking place.

The D2D terminal may, in conjunction with examples described herein, issue notifications and/or signaling messages exchanged from or to or in-between a device component and another to announce or inform about actions that may be undertaken as part of its receiver processing. It may issue such notifications or signaling messages to other devices. The D2D terminal may be configured to perform the examples described herein, for example, as a function of selected reception conditions, receiver configurations, timers or counters or index values.

A D2D terminal may process multiple D2D channels and/or signals to be transmitted or received, for example, based on priority associated with these D2D channels or signals. Processing may involve the selection of transmission and/or reception opportunities of a D2D channel and/or signal (e.g., first D2D channel and/or signal) as a function of those useful for a D2D channel and/or signal (e.g., second D2D channel and/or signal).

Reception to process multiple D2D data channels by a device may be described herein.

D2D terminals may process multiple received (e.g., concurrently received) D2D channels or signals based on priority of the received D2D channel and/or signals.

A receiving D2D terminal may receive multiple incoming (e.g., concurrent incoming) D2D channels or signals. Based on the priority for the received D2D channels or signals, it may store (e.g., temporarily store) received channel samples, demodulated or decodable bit streams or decoded information contents that may correspond to a received lower priority D2D channel and/or signal in memory, while processing and/or forwarding another higher priority D2D channel and/or signal and/or presenting it to user or device output.

Figure 10:
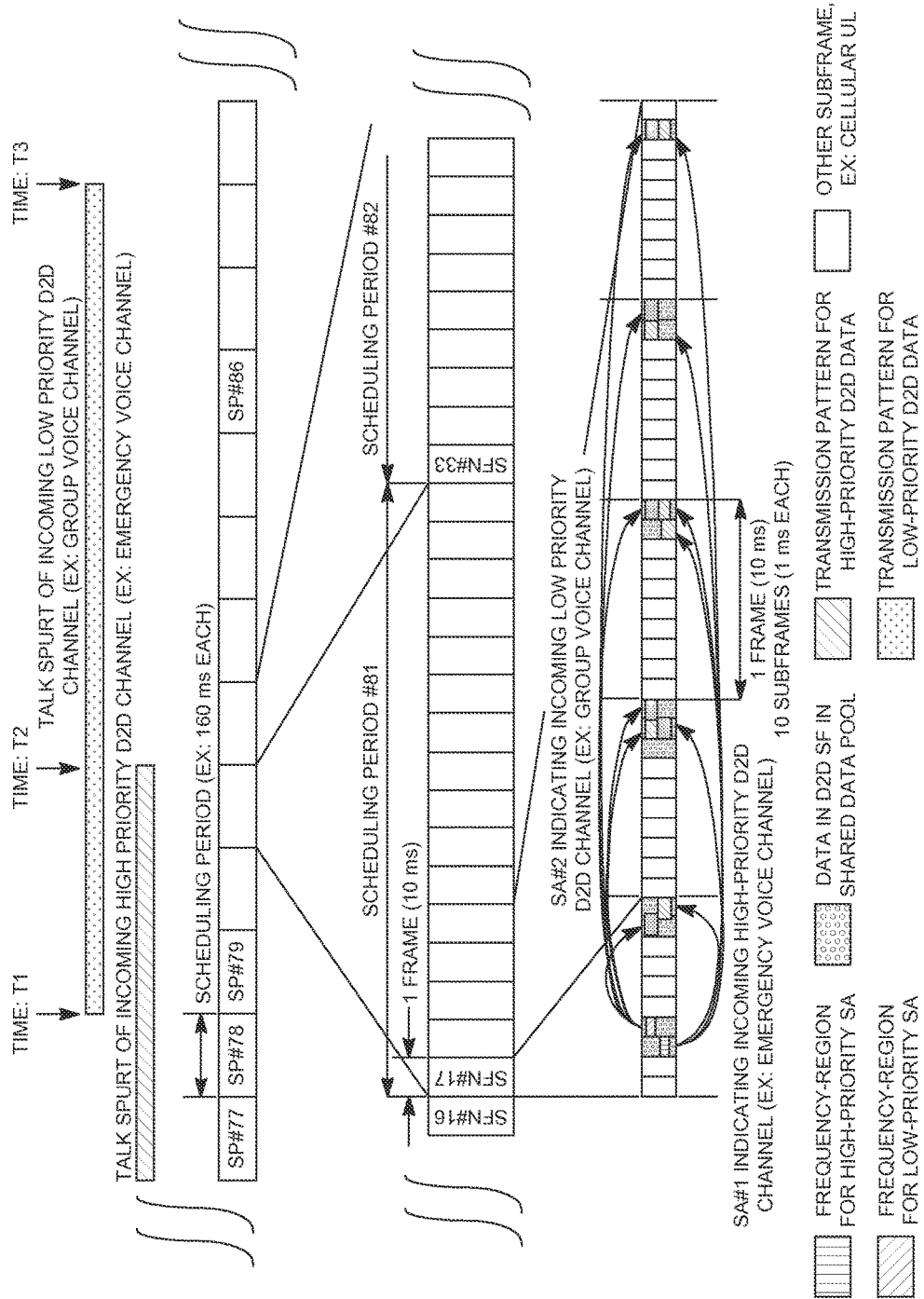
FIG. 10 is an example of multiple concurrently received D2D channels (for example, voice).

FIG. 10 is an example diagram of multiple concurrently received D2D channels (e.g., voice). In FIG. 10, a D2D terminal may concurrently receive a D2D voice channel (e.g., first high priority D2D voice channel), such as for an emergency first responder direct voice line and/or a D2D voice channel (e.g., second lower priority D2D voice channel), such as for a push-to-talk group call.

In FIG. 10, a talk spurt corresponding to the high priority D2D voice channel (e.g., first high priority D2D voice channel) may be received over multiple scheduling periods until time instant T2. A talk spurt of a low priority D2D voice channel (e.g., second low priority D2D voice channel) may be received beginning from time instant T1. The D2D terminal may have one audio processing front-end chain, for example at any given point in time decoded (e.g., only decoded) voice samples of one channel may be presented to audio output, such as speakers or otherwise, the D2D terminal may process (e.g., only process) one received voice channel at a time. The D2D terminal may be able to receive both the low-priority and/or the high-priority D2D channels and/or control signaling simultaneously in different subframes or in the same or similar subframes that may be used to carry D2D channels and/or signals.

Perhaps upon the start of reception of the low priority D2D voice call (e.g., second low priority D2D voice call in FIG. 10) at time instant T1, among other scenarios, the D2D terminal may continue to demodulate, to decode and/or to forward to the audio output path of the device any D2D data obtained from the high priority voice channel (e.g., first high priority voice channel in FIG. 10) while it may store (e.g., temporarily store) any decoded samples or signal representations of the (e.g., concurrently) received lower priority D2D voice call (e.g., second lower priority D2D voice call in FIG. 10) into memory. At time instant T2, when the talk spurt of the high priority D2D voice channel (e.g., first high priority D2D voice channel in FIG. 10) ends and the low priority D2D voice channel (e.g., only the low priority D2D voice channel in FIG. 10) may be received, the D2D terminal may switch its audio path from the high priority D2D voice channel to the low priority D2D voice channel. Forwarding such stored channel samples and/or decoded information contents corresponding to the low priority D2D voice channel from the memory (e.g., temporary memory) to the audio path may involve a time delay or time lag. For the example, in FTC. 10, three scheduling periods or around 480 ms or 24 voice frames at 20 ms codec intervals each are processed and replayed from temporary memory. One or more (e.g., many) D2D applications may correspond to push-to-talk type of voice rather than bi-directional conversational voice. Such a time-delay or time-lag introduced through storing (e.g., temporarily storing) the low priority D2D voice channel may be acceptable.

The D2D receiver processing may be improved, for example, in that a D2D terminal may (e.g., automatically) receive and/or process multiple D2D channels or signals (e.g., concurrent D2D channels or signals) based on priority handling associated with such received multiple D2D channel and/or signals. No user intervention, similar to manual channel switching, may be useful. Higher priority D2D channels and/or signals may be prioritized through D2D terminal processing upon reception, for example, in the presence of other channels and/or signals.

The WTRU may be configured or pre-configured with rules to determine whether data of different priority can be multiplexed together in one PDU or whether they may be required to be transmitted in different transmission opportunities. For example, the network may allow a WTRU to multiplex data belonging to a second and third priority level but not data corresponding to a first priority level. This restriction may be beneficial, e.g., if the WTRU wants to optimize the transmission of emergency services without multiplexing data of lower priority in the same TB.

Examples described herein and FIG. 10 may be extended to more than two priority classes. Different lengths of scheduling periods may be used. SA transmissions may correspond to D2D data transmitted in a later or in multiple scheduling periods. Independently or in conjunction with scheduling periods, principles of semi-persistent, time-limited or dynamically granted D2D data transmissions may be used. Time and/or frequency resources might not be contiguous. While the examples used scheduling assignments and high and low priority received D2D voice channels for illustration purposes, the principle of temporarily buffering and storing of a samples corresponding to a low priority D2D channel and/or signal may equally be applied to different D2D channel and/or signal messages types. For example, D2D Discovery messages may be (e.g., temporarily) stored for processing at a later lime instant, while high priority D2D control or data signaling may be processed upon reception.

Received D2D data (e.g., concurrently received D2D data) may be voice, control, service and/or data packets, such as for example IP packets corresponding to a file download. The use of buffering and/or storing (e.g., temporary buffering and/or storing) in memory of samples corresponding to a received D2D channel (e.g., second received D2D channel) may be applied, for example, to avoid receiver limitations in a D2D terminal for device architecture, component availability for real-time processing, device output representation of received D2D data, and/or required user interaction, etc. Receiver processing and/or prioritization of multiple received (e.g., concurrently received) channels and signals may equally be applied to channels or signals received from the cellular communications and the D2D radio links.

A D2D terminal, while receiving a D2D channel and/or signal (e.g., first D2D channel and/or signal), may determine whether a D2D channel and/or signal. (e.g., second D2D channel and/or signal) may be received. Upon determination that a D2D channel and/or signal (e.g., second D2D channel and/or signal) may be received, the D2D terminals may determine which one of the received (e.g., concurrently received) D2D channels or signals may be directly processed and/or which one may be stored (e.g., temporarily stored) in memory. The determination may be based on priorities associated with received D2D channels or signals or communication types. Directly processing any decoded samples of a D2D channel and/or signal may imply presenting these samples to user output, such as the terminal's audio path, or it may imply forwarding such samples to other processing components implemented on the D2D terminal, such as an application processing data packets. Storing (e.g., temporarily storing) in memory may be combined with partial receiver processing, such as for a channel demodulation of received a D2D channel and/or signal, or a channel decoding technique of demodulated samples, or protocol processing of such samples. A D2D terminal may determine when to process any D2D data stored (e.g., temporarily stored) in memory. The D2D terminal may determine to apply direct processing, for example, as described herein to the stored (e.g., temporarily stored) samples or information contents of the D2D channel and/or signal. The D2D terminal may forward the stored samples to output components of the device, such as audio or video or to other processing logic or applications processing received data on the device. It may determine that stored samples may be discarded, for example, if a time delay or a selected set of conditions may be met. Samples may be stored in permanent storage, for example, to allow the end-user to listen at a later time.

The D2D terminal, conjunction with examples described herein, may issue notifications and/or signaling messages exchanged from or to or in-between a device component and another to announce and/or inform about actions that may be undertaken as part of its receiver processing. It may issue such notifications or signaling messages to other devices. The D2D terminal may be configured to perform examples described herein as a function of selected reception conditions, receiver configurations, timers or counters or index values.

A D2D terminal may process multiple received D2D channels or signals, for example, based on priority of received (e.g., concurrently received) D2D channels or signals. Processing may involve receiving and/or discarding and/or prioritizing for reception a D2D channel and/or signal, for example, in the presence of other D2D channels or signals.

A D2D terminal may selects a received (e.g., first received) D2D channel and/or signal for direct processing, for example, while selecting a received (e.g., second received) D2D channel and/or signal for storage (e.g., temporary storage). Direct processing and/or temporary storage may correspond to the example realizations described herein, for example with respect to the example receiver.

One or more techniques are contemplated for reception by a D2D WTRU serving as a Relay Node. A relay WTRU may operate as an L3 relay. In such scenarios, among others, data received over the D2D link may be forwarded to one or more upper layers (e.g. IP, among others), perhaps for example before it may be sent over the Uu interface to an eNB. A relay WTRU may implement (e.g. particular) handling for priority, perhaps for example when it may receive data (e.g., over the D2D link) and/or may relay this traffic over the cellular link to the network. The prioritization of data transmitted by a WTRU to the network (e.g., via a relay) may be the same or substantially similar prioritization on the D2D link as the prioritization experienced over the cellular link from the relay WTRU to the eNB.

In one or more techniques, the relay node may request and/or create one or more separate radio hearers for one or more, or each, level of priority of data that it may receive, of example from any of the remote WTRUs it may be currently serving. The relay WTRU may utilize one or more existing radio bearers that may be associated with (e.g., varying) degrees of Quality of Service (QoS), perhaps for example to serve the one or more different priority transmissions made by the remote WTRU towards the relay (e.g., with higher priority transmissions being mapped to one or more bearers with better QoS, or the like), among other scenarios.

A relay WTRU may setup one or more, or a set, of radio bearers for one or more, or each, of the N priority levels it may be serving, and/or the WTRU may select one or more existing radio bearers that may be used for data associated with one or more, or each priority level. Perhaps when the relay WTRU receives data from the D2D link, for example, among other scenarios, it may determine the priority of the packet(s) received from a remote WTRU. This determination may be done, for example, at the MAC layer, the IP layer, and/or the application layer, among other layers. For example, if the determination is done at the MAC layer, the priority level of the received MAC PDU can be determined by one or more of:

- Having the transmitter of the MAC PDU include a priority level in the MAC header. In such scenarios, among others, the receiving MAC entity may determine the priority based on the associated priority level found in the MAC hearer for that PDU, for example; and/or
- Assuming a static and/or determined mapping between logical channel IDs and priority. The value of the logical channel ID may be associated with a specific priority. For instance, LCIDs 1-8 could be utilized for D2D communication, and the priority level may be associated with the chosen ID (e.g., in increasing/decreasing order of priority).

The WTRU may send the received data, perhaps along with the associated priority level, to one or more higher layers (e.g., an IP layer) for forwarding over the cellular link.

For example, if the priority determination is done at the IP layer, and/or the application layer, the associated priority may be sent with the IP packet and/or with the associated application layer data, perhaps for example so that the relay WTRU may be aware of the priority of the received data. The data may be (e.g., first) forwarded to the one or more higher layers where the priority determination may be performed.

Perhaps based on the priority of the received data, for example, the relay WTRU may determine which radio bearer (e.g., with associated QoS level) to use for transmission of the received data. The relay WTRU may maintain a mapping of radio bearer to priority level, and/or may use this mapping to decide which radio bearer one or more IP packet(s) may be sent over. The WTRU may be configured (e.g., dynamically) with a mapping of priority level to radio bearer by the eNB, and/or may use this mapping for transmitting one or more IP packets over the one or more existing radio bearers.

In some techniques, one or more, or multiple, radio bearers with the same or similar QoS characteristics may be used by the relay WTRU to transmit data received from the remote WTRU to the eNB/network. The relay WTRU may (e.g., selectively) forward the higher priority data to the one or more upper layers, perhaps for example while buffering the lower priority data for a certain period of time. The relay WTRU, perhaps when processing one or more, or each, of the logical channels that may be used to transmit data that was received from the remote WTRU, among other scenarios, may process the higher priority (e.g., forwarded to the higher layers), and/or may process the lower priority data perhaps when (e.g., only when) the lower priority data is forwarded to the higher layers.

For example, the relay WTRU may be configured with a timer over which lower priority data may be buffered, perhaps for example while forwarding higher priority data. The timer may be reset one or more, or each time, a higher priority packet is received by the relay WTRU and/or forwarded to the one or more upper layers. Perhaps after (e.g., only after) the timer expires (e.g., which may indicate that no higher priority data is received for a period of time), among other scenarios, the WTRU may forward any buffered lower priority data to the one or more upper layers.

For example, the relay WTRU may forward lower priority data for a scheduling period, perhaps for example when (e.g. only when) no higher priority data has been received for that scheduling period. Perhaps for example if a given scheduling period in the WTRU experiences the reception of high priority data, one or more, or all, lower priority data may be buffered in the one or more lower layers of the relay WTRU, perhaps while the higher priority data (e.g., only the higher priority data) may forwarded to the one or more upper layers.

In some techniques, the WTRU may (e.g., selectively) forward data to the upper layers with a particular probability. A higher probability of forwarding may be associated with the higher priority data/channel, and/or a lower probability of forwarding may be associated with the lower priority data/channel. The higher layer may process the data, perhaps for example in the order received.

For example, the relay WTRU receiving data with for example two different priorities (e.g., high and low) may be configured with a first probability (P1)=0.8 for higher priority data and/or a second probability (P2)=0.2 for lower priority data. Perhaps for example if the relay WTRU, at any time, contains high priority and/or low priority data to be forwarded to the one or more upper layers, the relay WTRU may select a random number between 0 and 1. For example, the relay WTRU may forward the high priority data perhaps if the number is larger than 0.2. Perhaps for example if the number is otherwise, the relay WTRU may forward the lower priority data.

Although some techniques may have been described herein using two priority levels, any of the contemplated techniques can be extended to multiple (N) priority levels by a person skilled in the art.

Transmission to process multiple D2D data channels in a device may be described herein. D2D terminals may process multiple D2D channels or signals (e.g., concurrent D2D channels or signals) to be transmitted based on priority of the D2D channels or signals.

A D2D terminal may transmit and/or wish to transmit multiple D2D channels or signals (e.g., concurrently). Based on the priority for the D2D channels or signals to be transmitted, it may store (e.g., temporarily store) information contents or encoded bit streams or samples corresponding to a lower priority D2D channel and/or signal to be transmitted in memory, for example, while processing and/or forwarding another higher priority D2D channel and/or signal and presenting it to the transmit path.

A D2D terminal may transmit and/or wish to transmit a D2D signal en no resource may be available for transmission. It may store (e.g., temporarily store) information contents or encoded bit streams or samples of this signal, for example, until a resource may become available and/or until a timer expires. Upon expiration of the tinier, the samples may be discarded or stored in storage (e.g., permanent storage) to allow the end-user to access the non-transmitted signal later.

Figure 11:
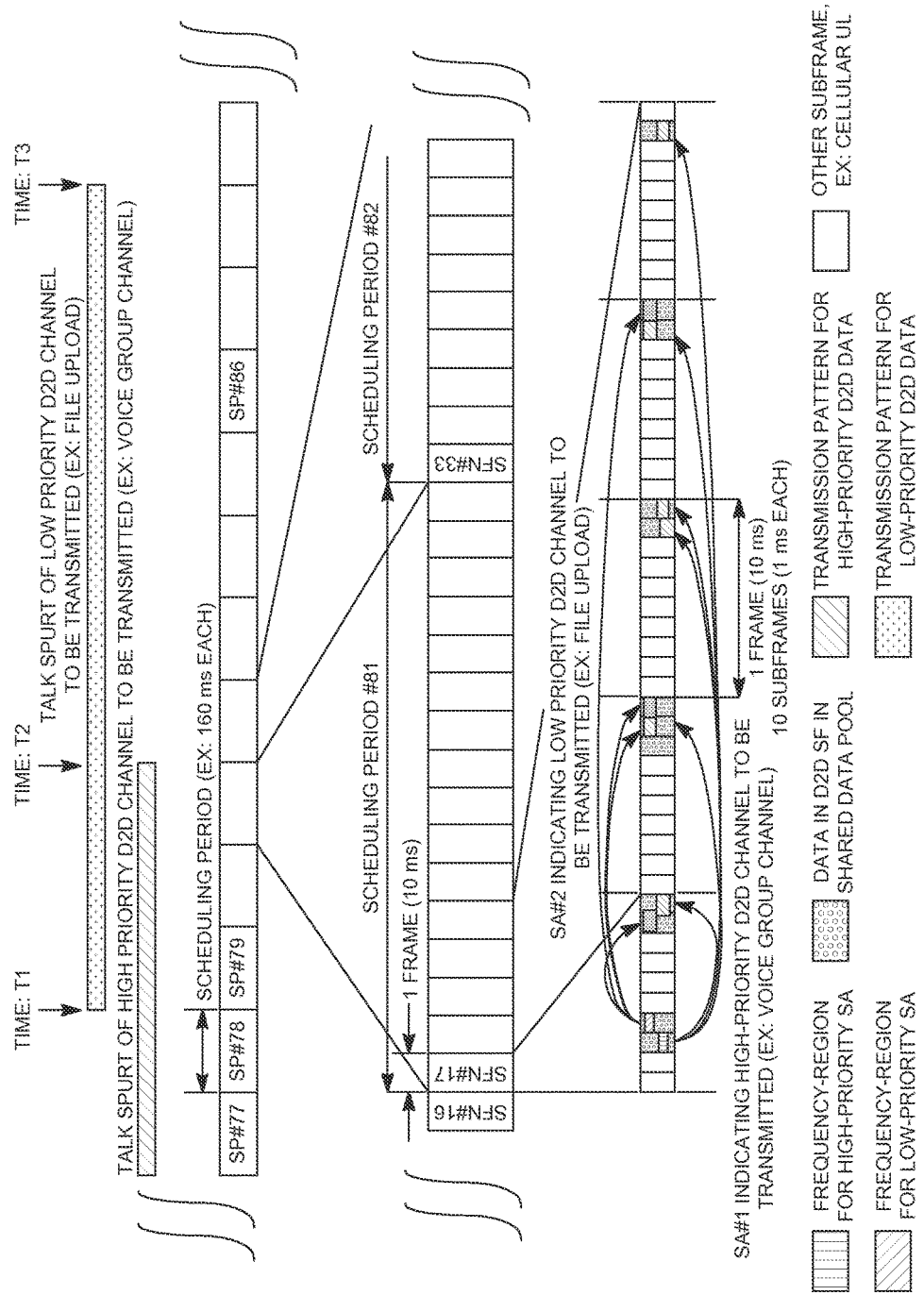
FIG. 11 is an example of multiple concurrently D2D channels to be transmitted (for example, voice and data).

FIG. 11 is an example diagram of multiple concurrent D2D channels to be transmitted (e.g., voice and data). In FIG. 11, a D2D terminal may transmit (e.g., concurrently transmit) a high priority D2D voice channel (e.g., first high priority D2D voice channel), such as a voice call group channel and/or a lower priority D2D channel (e.g., second lower priority D2D channel), such as a file upload.

In FIG. 11, a talk spurt corresponding to the high priority D2D voice channel (e.g., first high priority D2D voice channel) may be processed by the D2D terminal over multiple scheduling periods, for example, until time instant T2. A device internal request to transmit a low priority D2D data channel (e.g., second low priority D2D data channel) may be received, for example, beginning from time instant T1. The request may be issued by the user or by an application that may process data packets for D2D and/or may emit such a request. The D2D terminal may have a transmit (e.g., single transmit) front-end chain. In any given subframe, one or more (e.g., only one) Transport Block (TB) of a D2D channel may be presented to the Tx path, for example, in order to use its (e.g., full) available output power on that subframe for the D2D channel under consideration. This may maximize the achievable link budget for the D2D channel. The D2D terminal may be able to transmit the high priority and/or the low priority D2D channels and/or its control signaling (e.g., simultaneously control signaling) in different subframes.

Upon arrival of a transmission request for the low priority D2D data channel (e.g., second low priority D2D data channel) at time instant T1, the D2D terminal may continue to forward to the transmission path any D2D data that may be available for the high priority voice channel (e.g., first high priority voice channel) while it stores (e.g., temporarily stores) and/or buffers in memory any samples or signal representations of the to be transmitted (e.g., concurrently to be transmitted) lower priority D2D data channel (e.g., second lower priority D2D data channel). At time instant T2, when the talk spurt of the high priority D2D voice channel (e.g., first high priority D2D voice channel) may end and the low priority D2D data channel (e.g., only the low priority D2D data channel) may be transmitted, the D2D terminal may switch its transmission path from the high priority D2D voice channel to the low priority D2D data channel. Forwarding such stored samples and/or information contents corresponding to the low priority D2D data channel from the memory (e.g., temporary memory) to the transmission path may involve a time delay or time lag. For example, in FIG. 11, around three scheduling periods or around 480 ms may be processed from temporary memory. Given that D2D applications may correspond to non-time critical data type, for example rather than bi-directional conversational voice, such a time-delay or time-lag introduced through storing (e.g., temporarily storing) portions or the entirety of the low priority D2D data transmission may be acceptable.

In FIG. 11, the D2D terminal may multiplex lower priority D2D data transmissions intermittently, for example, during an ongoing higher priority D2D voice channel transmission. It may do so in the D2D subframes (e.g., only in the D2D subframes in FIG. 11) that might not be used for transmission of transport blocks for the higher priority D2D voice channel. By the time instant T2, lower priority D2D data that may be ready for transmission and received by the transmit path between time instants T1 and T2 for the low priority channel may have been sent between T1 and T2.

The D2D transmitter processing may be improved in that a D2D terminal may process (e.g., automatically process) multiple D2D channels or signals (e.g., concurrent D2D channels or signals) to be transmitted based on priority handling associated with such multiple D2D channel and/or signals to be transmitted. No user intervention, similar to manual channel switching or deferral of transmission, may be useful. Higher priority D2D channels and/or signals may be prioritized through D2D terminal processing upon request to send, for example, in the presence of other channels or signals.

The examples described herein and as shown in FIG. 11 may be extended to the cases of more than two priority classes. Different lengths of scheduling periods may be used SA transmissions may correspond to D2D data transmitted in a later or in multiple scheduling periods. Independently and/or in conjunction with scheduling periods, principles of semi-persistent, time-limited or dynamically granted D2D data transmissions may be used. Time and/or frequency resources might not be contiguous. The examples may have used scheduling assignments and high and low priority D2D voice and data channels to be transmitted for illustration purposes. The principle of temporarily buffering and storing of a samples corresponding to a low priority D2D channel and/or signal to be transmitted may equally be applied to different D2D channel and/or signal messages types. For example, D2D Discovery messages to be transmitted may be stored (e.g., temporarily stored) and/or queued for processing at a later time instant, while high priority D2D control or data signaling may be processed upon reception of a request to send in the D2D terminal.

D2D data channels or signals (e.g., concurrent D2D data channels or signals) to be transmitted may be voice, control, service and/or data packets, such as for example IP packets corresponding to a file upload. The use of buffering and/or storing (e.g., temporary buffering and/or storing) in memory of samples corresponding to a D2D channel (e.g., second D2D channel) to be transmitted may be applied to avoid transmitter limitations in a D2D terminal with respect to device architecture, component availability for real-time processing, device output representation of D2D data, usage of radio resources, and/or required user interaction, etc. Transmitter processing and/or prioritization of multiple channels and/or signals (e.g., concurrent channels and/or signals) to be transmitted may equally be applied to channels or signals to be transmitted on the cellular communications and the D2D radio links.

A D2D terminal, while transmitting a D2D channel and/or signal (e.g., first D2D channel and/or signal) may determine whether a request to send a D2D channel and/or signal (e.g., second) may be received. Upon determination that a D2D channel and/or signal (e.g., second D2D channel and/or signal) is to be transmitted, the D2D terminals may determine which of the D2D channels or signals (e.g., concurrent D2D channels or signals) to be transmitted may be directly processed and which may be stored (e.g., temporarily stored) in memory. The determination may be based on priorities associated with D2D channels or signals or communication to be transmitted. Directly processing any samples or information representative of a D2D channel and/or signal to be transmitted may imply presenting the information to the terminal's transmit path, or it may imply forwarding such samples to other processing components implemented on the D2D terminal. Storing (e.g., temporarily storing) in memory may be combined with partial transmitter processing, such as a channel modulation of a D2D channel and/or signal to be transmitted, a channel encoding of information, and/or protocol processing of such D2D channels or signals.

A D2D terminal may determine when to process any D2D data stored (e.g., temporarily stored) in memory. The D2D terminal may determine to apply direct processing, for example as described herein, to such stored (e.g., temporarily stored) samples or information contents of a D2D channel and/or signal to be transmitted. The D2D terminal may forward the stored samples to output components of the device, such as the transmitter path. It may determine that stored samples may be discarded if, for example, a time delay and/or a selected set of conditions may be met. The device may as part of transmitted (e.g., concurrently transmitted) portions of the low priority D2D channel and/or signal (e.g., second low priority D2D channel and/or signal), for example, during a time period when it may transmit a higher priority D2D channel, such as in subframes that might not be in use by the higher priority D2D channel and/or signal.

The D2D terminal in conjunction with examples described herein, issue notifications and signaling messages exchanged from or to or in-between one or more (e.g., one) device component and another to announce and/or inform about actions that may be undertaken as part of its transmitter processing. It may issue such notifications or signaling messages to other devices. The D2D terminal may be configured to perform examples described herein as a function of selected conditions, transmitter configurations, timers or counters, and/or index values, etc.

A D2D terminal may process multiple D2D channels or signals to be transmitted based on priority of the concurrent D2D channels or signals to be transmitted. Processing may involve transmitting and/or discarding and/or prioritizing portions or the entirety of a D2D channel and/or signal to be transmitted, for example in the presence of other D2D channels or signals to be transmitted by the device.

A D2D terminal may select a D2D channel and/or signal (e.g., first D2D channel and/or signal) to be transmitted for direct processing, while selecting a D2D channel and/or signal (e.g., second D2D channel and/or signal) to be transmitted for storage (e.g., temporary storage). Direct processing and/or storage (e.g., temporary storage) may correspond to the example realizations described herein with respect to the transmitter.

The D2D terminal may transmit D2D data by determining priority access groups and/or mapping from available D2D data channels or signals to available priorities or priority access groups.

Priority access groups to transmit data may be selected.

The WTRU may be configured with number of discrete priority access groups and may have multiple services or application running. The WTRU may determine how to map D2D data to transmit into the available priority access groups.

Priority access group may refer herein to any of the schemes or resource pool configurations described herein to support data prioritization and/or traffic differentiation (e.g. different resource pools with different priorities, prioritization access within the same resource pool, etc.).

The WTRU may determine the priority access group(s) to use based on one or more or a combination of the following parameters described herein. The WTRU may use a configured mapping between logical channel priorities or LCG priorities of ProSe bearers and/or ProSe/application layer packet and/or a priority access group. For example, ProSe bearers configured with logical channel priority 1-4 may be mapped to priority access group 1 or highest priority group. One or more, or each, service associated with a particular group, traffic type, and/or user type may have an assigned priority by higher layers. When the packet arrives to the access stratum it may be mapped to a logical channel or PDCP entity based on the group destination, source destination, and/or associated priority. For the given logical channel the WTRU may be aware of the priority of the packets and based on a mapping the WTRU may determine to which priority access group the packet or logical channel belongs to. The WTRU may determine the priority access groups) based on a mapping of a TFT to a priority access group or to a logical channel (or packet) priority. The WTRU may be configured with a set of TFT filters for one or more, or each, traffic type, and the priority of the logical channel or access group to be associated with one or more, or each, traffic type. For example, the WTRU may be configured with (e.g., three) TFT filters and mapping rules for one or more, or each, of them (e.g. voice traffic gets mapped to priority access group 1, video traffic to priority access group 2 and data traffic to priority access group 3). The WTRU may perform traffic inspection to determine the traffic class of one or more, or each packet, and/or it may look up the configured mapping rules to determine which priority access group may be used, for example.

The WTRU may determine the priority access group(s) to use based on a mapping of EPS bearer and/or radio bearer from which a WTRU, perhaps acting as a relay and/or (e.g., first) receiving the data over a cellular/Uu link, may receive the data, to the priority access group over the D2D link. For example, a WTRU acting as a relay may be configured with separate EPS/radio bearers to transmit data for different priority levels. The WTRU may map data received over a specific EPS bearer to a specific priority access group, perhaps for example based on pre-configured and/or signaled (e.g. by the eNB or ProSe function) mapping.

The WTRU may determine the priority access group(s) based on a device configuration, on a per device basis (e.g., one or more or all services from that devices may use or always use the same or similar priority access). The WTRU may be configured with a device/WTRU priority, for example, based on hierarchy in the group (e.g., fireman chief is configured to have highest priority in the group). The WTRU may determine the priority access group(s) based on observed traffic characteristics in the WTRU. The WTRU may maintain past and/or ongoing traffic characteristics (e.g. inter-arrival time, data rate, etc.) and/or may determine appropriate priority access group that may be used to fulfil those traffic characteristics. The WTRU may determine the priority access group(s) based on the function of the D2D WTRU. For example, if the WTRU may be operating as a relay, some or all traffic may be mapped to a certain priority access group, or the WTRU may be configured to use different (e.g., higher) priority access groups when operating as a relay. The WTRU may determine the priority access group(s) as a function of services configured by higher layers. For example, if higher layers request a D2D request for emergency service, the WTRU may determine the usefulness to use emergency priority access group.

The configuration parameters described herein may be provided to the WTRU, for example, along with D2D service or bearer configuration, such as by RRC or higher layer signaling (e.g. from the ProSe function). The WTRU may be pre-configured with the mapping rules.

An in-coverage WTRU may be configured to report the priority access groups the WTRU may be using to the ProSe function/eNB. The eNB may be given the configuration parameters described herein (e.g. mapping of LCG ID, logical channels, priority level, and/or the priority access group) from the ProSe function and/or from another node in the network (e.g. MME), for example in scenarios such as where the mapping might not be determined (e.g., solely) by the WTRU, among other scenarios.

Selected priority access pools may be utilized for transmission.

The WTRU may determine how to multiplex the data into the selected priority access groups and/or transmit data using the characteristics of the priority access group. Features described herein may be applicable for the case where the WTRU in one transport block can (e.g., only) multiplex data belonging to one source-destination pair and/or applicable to the case where the WTRU can multiplex data belonging to different destinations.

The WTRU may determine how to multiplex and where to send some or all data using one or more (e.g., only one) determined priority access group. For example, the WTRU may determine to send all D2D using the priority access group with highest priority among the selected access groups (e.g. if a D2D emergency service was requested by higher layers, some or all traffic from that device may be sent using emergency priority access group). For example, the WTRU may determine the highest priority service or priority access group that has data available and determine the resources or transmission characteristics in which this priority service can be transmitted. The WTRU may be allowed to multiplex priority services together (e.g., any of the priority services together) and transmit them using the transmission characteristics of the highest priority data. Logical channel prioritization may be performed in the transmitter, for example, to prioritize higher traffic class from lower traffic class for one or more; or each, PDU creation. In a case where the WTRU is limited to multiplexing data from one source-destination pair, the WTRU may determine the highest priority service or data across destination(s) (e.g., all destinations), determine the transmission characteristics and resources for that priority and may multiplex data from different priorities belonging to that destination in the same PDU, e.g., according to LCP and available space.

The logical channels that can be multiplexed together may further be restricted to the destination in which the highest priority service within that access group belongs to.

The data may be segregated to be sent using multiple priority access groups. For example, the WTRU may determine to multiplex data belonging to the same priority access group together and/or transmit them using the characteristics of the selected priority access group. If one or more (e.g., two) priority access groups are configured (e.g., high and low), the WTRU may classify the configured logical channels into one or more (e.g., two) groups, and it may run (e.g., individual) logical channel prioritization to multiplex logical channels within one or more, or each, group into a separate packet.

One or more, or each, packet may be sent to lower layer, for example, along with a priority access group indicator. One or more, or each, packet may be associated with a separate indicator, for example, to indicate that pre-emption may be used to transmit the packet (e.g., if supported).

Triggers to determine priority access group may be described herein. The WTRU may determine the usefulness to select priority access groups and/or change priority access groups it may be using on detecting one or more of the following triggers: upon initiation/termination of D2D service (e.g. emergency call); when D2D data may be available to transmit; when D2D data may be available to transmit, for example at the beginning of a scheduling period; when the function of WTRU changes (e.g., WTRU may start and/or stop operating as a relay); when the new D2D resource configuration may be provided from the higher layers.

Priority access group may change. When the WTRU may select a new priority access group and/or decide to remap D2D data to a different priority access group(s), the WTRU may be configured to perform one or more of the following actions: stop using the earlier priority access groups for resource selection; determine traffic types and logical channels or group of logical channels that may belong to selected priority access groups; perform resource selection to select resources and/or transmission opportunities for one or more, or each, of selected priority access groups; perform logical channel prioritization for one or more or all logical channels that may belong to a selected priority access group and/or generate packet.

Although features and elements are described with reference to LTE (e.g., LTE-A) and LTE terminology, the features and elements described herein may be application to other wired and wireless communication protocols, for example, HSPA, HSPA+, WCDMA, CDMA2000, GSM, WLAN, and/or the like.

Although features and elements are described above in particular combinations, one of ordinary skill in the art will appreciate that one or more, or each, feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) in communication with a wireless communication network, the WTRU comprising a memory, a processor, a transmitter, and a receiver, the WTRU configured to:
   perform signal strength measurements on one or more signals received from at least a first node of the wireless communication network;
   randomly select grant transmission resources from one or more available transmission resources for data of a first priority, wherein the one or more available transmission resources are determined by the WTRU based on: (1) the WTRU comparing the one or more signal strength measurements to a first threshold corresponding to data of the first priority, (2) the WTRU selecting one or more resource duration periods for the grant transmission resources; and (3) the WTRU determining at least one resource release indication for the grant transmission resources; and
   transmit information indicating the selected one or more resource duration periods to a second node of the wireless communication network using the randomly selected grant transmission resources.

2. The WTRU of claim 1, wherein the one or more signals includes one or more scheduling assignments.

3. The WTRU of claim 1, wherein the first threshold corresponding to the first priority is preconfigured.

4. The WTRU of claim 1, wherein the receiver is further configured to receive the first threshold corresponding to data of the first priority via Radio Resource Control (RRC) signaling.

5. The WTRU of claim 1, wherein the transmitter is further configured to transmit the data of the first priority using the randomly selected grant transmission resources.

6. The WTRU of claim 1, wherein the first node is at least one of an evolved NodeB (eNB), or another WTRU.

7. The WTRU of claim 1, wherein the randomly selected grant transmission resources comprises a first selection of one or more first priority transmission resources from the one or more available transmission resources for data of the first priority, and
wherein the processor is further configured to:
randomly select a second selection of the one or more first priority transmission resources from the one or more available transmission resources for data of the first priority; and
replace the first selection of the one or more first priority transmission resources with the second selection of the one or more first priority transmission resources.

8. The WTRU of claim 1, wherein the one or more available transmission resources for data of the first priority are assigned to one or more first priority transmission resource pools.

9. The WTRU of claim 8, wherein the grant transmission resources are randomly selected from the one or more first priority transmission resource pools.

10. The WTRU of claim 1, wherein the processor is further configured to:
randomly select second grant transmission resources from one or more available transmission resources for data of a second priority, wherein the one or more available transmission resources are determined by the WTRU based on: (1) the WTRU comparing the one or more signal strength measurements to a second threshold corresponding to data of the second priority, (2) the WTRU selecting one or more resource duration periods for the second grant transmission resources; and (3) the WTRU determining at least one resource release indication for the second grant transmission resources.

11. The WTRU of claim 10, wherein the transmitter is further configured to transmit the data of the second priority using the randomly selected second grant transmission resources,
wherein the data of the first priority is higher in priority to the data of the second priority.

12. A method performed by a wireless transmit/receive unit (WTRU) in communication with a wireless communication network, the method comprising:
performing signal strength measurements on one or more signals received from at least a first node of the wireless communication network;
randomly select grant transmission resources from one or more available transmission resources for data of a first priority, wherein the one or more available transmission resources are determined by the WTRU based on: (1) the WTRU comparing the one or more signal strength measurements to a first threshold corresponding to data of the first priority, (2) the WTRU selecting one or more resource duration periods for the grant transmission resources; and (3) the WTRU determining at least one resource release indication for the grant transmission resources; and
transmitting information indicating the selected one or more resource duration periods to a second node of the wireless communication network using the randomly selected grant transmission resources.

13. The method of claim 12, further comprising transmitting the data of the first priority using the randomly selected grant transmission resources.

14. The method of claim 12, wherein the randomly selected grant transmission resources comprises a first selection of one or more first priority transmission resources from the one or more available transmission resources for data of the first priority, the method further comprising:
randomly selecting a second selection of the one or more first priority transmission resources from the one or more available transmission resources for data of the first priority; and
replacing the first selection of the one or more first priority transmission resources with the second selection of the one or more first priority transmission resources.

15. The method of claim 12, further comprising:
randomly select second grant transmission resources from one or more available transmission resources for data of a second priority, wherein the one or more available transmission resources are determined by the WTRU based on: (1) the WTRU comparing the one or more signal strength measurements to the second threshold corresponding to data of a second priority, (2) the WTRU selecting one or more resource duration periods for the second grant transmission resources; and (3) the WTRU determining at least one resource release indication for the second grant transmission resources.

16. The method of claim 15, further comprising transmitting, via a transmitter, the data of the second priority using the randomly selected second grant transmission resources,
wherein the data of the first priority is higher in priority to the data of the second priority.

17. A wireless transmit/receive unit (WTRU) in communication with a wireless communication network, the WTRU comprising a memory, a processor, a transmitter, and a receiver, the WTRU configured to:
randomly select grant transmission resources from one or more pools of available transmission resources for data of a first priority, wherein the one or more pools of available transmission resources are determined by the WTRU based on: (1) the WTRU selecting one or more resource duration periods for the grant transmission resources; and (2) the WTRU determining at least one resource release indication for the grant transmission resources;
transmit the one or more resource duration periods to a first node of the wireless communication network; and
transmit the data of the first priority using the randomly selected grant transmission resources to the first node of the wireless communication network.

18. The WTRU of claim 17, wherein the WTRU is configured to:
receive one or more signals from at least a second node of the wireless communication network;
identify the available transmission resources for data of the first priority based on information in the one or more signals; and
assign the available transmission resources for data of the first priority to the one or more pools of available transmission resources for data of the first priority based on the information in the one or more signals.

19. The WTRU of claim 18, wherein the second node is at least one of an evolved NodeB (eNB), or another WTRU.

20. The WTRU of claim 17, wherein the processor is further configured to:
randomly select second grant transmission resources from one or more pools of available transmission resources for data of a second priority, wherein the one or more pools of available transmission resources are determined by the WTRU based on: (1) the WTRU selecting one or more resource duration periods for the second grant transmission resources; and (2) the WTRU determining at least one resource release indication for the second grant transmission resources,
wherein the transmitter is further configured to transmit the data of the second priority using the randomly selected second grant transmission resources, and
wherein the data of the first priority is higher in priority to the data of the second priority.

21. The WTRU claim 1, wherein the WTRU is further configured to transmit the at least one resource release indication to the second node of the wireless communication network.

22. The method of claim 12, further comprising transmitting the at least one resource release indication to the second node of the wireless communication network.

23. The WTRU of claim 17, wherein the WTRU is further configured to transmit the at least one resource release indication to the first node of the wireless communication network.

* * * * *